United States Patent
Barker et al.

(10) Patent No.: US 9,674,580 B2
(45) Date of Patent: Jun. 6, 2017

(54) METHOD AND SYSTEM FOR RECORDING VIDEO DIRECTLY INTO AN HTML FRAMEWORK

(71) Applicant: VIPELINE, INC., Jersey City, NJ (US)

(72) Inventors: David James Barker, Jersey City, NJ (US); Vernon Alexander Hamilton, Jersey City, NJ (US); Peter J. Ladka, Warwick, NY (US); Robert Emmet Christopher Wall, Kingston, NJ (US)

(73) Assignee: VIPELINE, INC., Jersey City, NJ (US)

(*) Notice: Subject to any disclaimer, the term of this patent is extended or adjusted under 35 U.S.C. 154(b) by 0 days.

(21) Appl. No.: 15/048,525

(22) Filed: Feb. 19, 2016

(65) Prior Publication Data
US 2016/0345066 A1 Nov. 24, 2016

Related U.S. Application Data

(63) Continuation-in-part of application No. 13/674,002, filed on Nov. 10, 2012.

(60) Provisional application No. 61/618,720, filed on Mar. 31, 2012, provisional application No. 62/163,710, filed on May 19, 2015, provisional application No. (Continued)

(51) Int. Cl.
| | |
|---|---|
| H04N 7/173 | (2011.01) |
| H04N 21/4788 | (2011.01) |
| H04N 5/77 | (2006.01) |
| G11B 27/036 | (2006.01) |
| H04N 21/2743 | (2011.01) |
| G11B 27/36 | (2006.01) |
| G10L 15/18 | (2013.01) |
| H04N 21/81 | (2011.01) |
| H04N 21/8543 | (2011.01) |
| H04N 21/442 | (2011.01) |
| H04N 21/2343 | (2011.01) |
| H04N 21/2668 | (2011.01) |

(52) U.S. Cl.
CPC ..... *H04N 21/4788* (2013.01); *G10L 15/1822* (2013.01); *G11B 27/036* (2013.01); *G11B 27/36* (2013.01); *H04N 5/77* (2013.01); *H04N 21/23439* (2013.01); *H04N 21/2668* (2013.01); *H04N 21/2743* (2013.01); *H04N 21/44222* (2013.01); *H04N 21/812* (2013.01); *H04N 21/8543* (2013.01)

(58) Field of Classification Search
CPC ............ H04N 21/2743; H04N 21/437; H04N 21/4782; H04N 21/6175; H04N 21/4223; H04N 21/4788; H04N 21/2408
USPC .......................................... 725/112
See application file for complete search history.

(56) References Cited

U.S. PATENT DOCUMENTS

| | | |
|---|---|---|
| 6,311,161 B1 | 10/2001 | Anderson et al. |
| 2008/0152304 A1 | 6/2008 | Yoo et al. |

(Continued)

*Primary Examiner* — Jason Salce
(74) *Attorney, Agent, or Firm* — Leason Ellis LLP

(57) ABSTRACT

Provided herein are systems and methods directed to the recording, uploading, processing, viewing, and submitting of video and audio content via a digital asset in an HTML framework. The systems and methods disclose solutions to the problem of incorporating user video commenting systems regardless of framework, type of user device, or browser type. A digital asset can include such video commenting systems within expandable advertisements. Furthermore, such submitted videos can be moderated automatically via an interactive moderation interface.

12 Claims, 19 Drawing Sheets

Related U.S. Application Data

62/163,734, filed on May 19, 2015, provisional application No. 62/163,762, filed on May 19, 2015, provisional application No. 62/163,778, filed on May 19, 2015, provisional application No. 62/163,809, filed on May 19, 2015.

(56) References Cited

U.S. PATENT DOCUMENTS

| | | |
|---|---|---|
| 2010/0092150 A1 | 4/2010 | Bae |
| 2011/0099584 A1* | 4/2011 | Rodriguez ........ G06F 17/30864 725/51 |
| 2011/0317022 A1 | 12/2011 | Cao |
| 2012/0254759 A1* | 10/2012 | Greenberg .......... G06F 17/3089 715/719 |
| 2013/0029770 A1 | 1/2013 | Mahajan et al. |
| 2013/0302005 A1 | 11/2013 | Harwell et al. |
| 2014/0095974 A1 | 4/2014 | Cui et al. |
| 2015/0070516 A1 | 3/2015 | Shoemake et al. |
| 2016/0055183 A1* | 2/2016 | Fiero ................. G06F 17/30289 707/803 |

* cited by examiner

```
<div data-vipeline-moduleid="cee5b39b-6b12-4d7e-9950-c58d6b4ab4d3" data-vipeline-theme="dark"></div>

<script src="//vipelineprod1.blob.core.windows.net/app/Vipeline.js" data-vipeline-clientsiteid="3cg23439-7634-41c6-bbb8-78f870d6b6b1"></script>
```

Fig. 11

METHOD AND SYSTEM FOR RECORDING VIDEO DIRECTLY INTO AN HTML FRAMEWORK

CROSS REFERENCE TO RELATED APPLICATIONS

This application is a continuation-in-part of prior non-provisional application Ser. No. 13/674,002 filed Nov. 10, 2012, which claims the benefit of provisional application Ser. No. 61/618,720, and its contents are incorporated herein by reference in its entirety.

The present application is related to and includes the following U.S. Patent Applications, the entire contents of which are incorporated by reference as if set forth in its entirety herein:

Ser. No. 62/163,710, entitled "METHOD AND SYSTEM FOR RECORDING VIDEO DIRECTLY INTO AN HTML FRAMEWORK", filed on May 19, 2015;

Ser. No. 62/163,734, entitled "METHOD AND SYSTEM FOR RECORDING VIDEO DIRECTLY INTO AN HTML BANNER ADVERTISEMENT", filed on May 19, 2015;

Ser. No. 62/163,762, entitled "METHOD AND SYSTEM FOR INTEGRATING STANDALONE VIDEO RECORDING TECHNOLOGY INTO A THIRD PARTY APPLICATION", filed on May 19, 2015;

Ser. No. 62/163,778, entitled "METHOD AND SYSTEM FOR VIDEO MODERATION VIA AUDIO EXTRACTION AND AUTO-TRANSCRIBING", filed on May 19, 2015;

Ser. No. 62/163,809, entitled "METHOD AND SYSTEM FOR A MODERATION TOOL FOR VIDEO RECORDED AND SUBMITTED INTO A DIGITAL BANNER AD", filed on May 19, 2015.

FIELD OF THE INVENTION

The invention described herein generally relates to systems, methods and computer program products for recording, uploading, processing, viewing, and submitting user created video and audio through and for a digital asset (e.g., a web page, a banner advertisement, a downloadable application). In particular, the invention relates to systems, methods and computer program products for recording, uploading, processing, and viewing video and audio within HTML frameworks. The invention further relates to systems, methods and computer program products for recording, uploading, processing, viewing, and submitting video and audio via mobile devices without requiring an application download. Additionally, the invention relates to systems, methods and computer program products for the management and distribution of video and audio.

BACKGROUND OF THE INVENTION

Using currently known systems and methods, digital assets (e.g., web pages, banner advertisements, downloadable applications) can deliver content to end users in an HTML framework, via a web browser connected to the Internet and/or other networked systems. HTML program code can be included to create a user commenting platform within the digital asset. Such commenting platforms have heretofore been typically text based. Video and audio-based commenting platforms, in contrast to textual platforms, however, face the problem of incorporating HTML frameworks for use in ordinary web pages or within dynamically interactive media objects (e.g., expandable advertisements, etc.) across a variety of web browsers. Additionally, systems and methods available to those of skill in the art for providing video and audio commenting platforms lack cross-platform utilization across all manner of common computing devices (e.g., smartphones, tablets, laptops, desktops, etc.). Therefore, the state of the art requires novel systems and methods to address the computer-centric problem of implementing video and audio user submissions via commonly deployed web access technologies.

SUMMARY OF THE INVENTION

Implementations of the invention are directed towards systems, methods and computer program products for providing user generated video content in an advertisement, which may comprise the display and playback of one or more video comments in response to an advertisement.

In accordance with one implementation, the invention is directed towards a method for recording video into an HTML framework. The method according to this implementation comprises navigating to a digital asset comprising program code embedded within the HTML framework and displaying the digital asset onto a display at a user computing device, wherein the user computing device has a processor, a memory, and a connection to a network. The processor, executing code embedded within the HTML framework, presents a video recording user interface to a recorder application within the digital asset, wherein the video recording user interface has at least one interactive control. As is understood by those of skill in the art, the digital asset according to certain implementations is a web page coded in an HTML framework, which can comprise an advertisement.

Continuing with the present implementation, the method initiates a video recording session upon receipt of one or more commands that indicate interaction with the at least one interactive control and accesses at least one video and audio recording hardware component located at the user computing device. The at least one video and audio recording hardware components can comprise a camera and/or a microphone. The processor, executing code embedded within the HTML framework, creates a stream object for storage in memory, wherein the stream object is configured to pass video and audio data recorded by the at least one video and audio recording hardware component as input to the recorder application. Video and audio data received at the video and audio hardware is recorded to the stream object, which the processor executing code embedded within the HTML framework processes for storage as a binary large object ("BLOB") and transmission over the network to a video server for playback by one or more computing devices other than the user computing device. According to one implementation, playback of the video and audio data is within the context of the digital asset.

Specifically with regard to the step of recording the audio and video data, recording in accordance with certain implementations comprises creating a display canvas in the digital asset, which is accomplished by the processor executing code embedded in the HTML framework, and drawing one or more video frames into the display canvas. The method according to such implementations may comprise merging one or more video frames by the processor into a concatenated video file. Furthermore, the step of recording video and audio data may comprise the processor executing program code embedded in the HTML framework to receive and store pulse-code modulation ("PCM") audio data to the memory, which the processor can merge into a concatenated audio file. As is readily appreciated, the processor can extract and encode the video and audio data into separate video and audio files. Regardless of the specific technique that the method utilizes, however, the processor may execute program code to analyze the video file against a defined set of unacceptable image types. Similarly, the processor can execute program code for parsing to the audio file into one or more speech terms and analyzing the one or more speech terms against a defined list of unacceptable speech terms.

In accordance with another implementation, the invention is directed towards a method for recording video into an HTML framework that comprises navigating over a network to a digital asset provided by a video server. The digital asset comprises program code to implement a deployable advertisement embedded within the HTML framework, which a user computing device communicatively coupled across the network with the video server displays onto a display device. The user computing device comprises at least one video and audio recording hardware component. The method continues with monitoring, at the user computing device, for interaction with the deployable advertisement and the video server responding to such interaction by rendering an expanded version of the deployable advertisement on the display.

Continuing with the present implementation, a processor executing the program code embedded within the HTML framework presents a video recording user interface within the expanded deployable advertisement. The video recording user interface has at least one interactive control and allows for the recording of video and audio data received at the video and audio hardware through the video recording user interface. The method in accordance with the present implementation further comprises transmitting the video and audio data to the video server over the network and granting an approval status for distribution of such data through the deployable advertisement. The approval status is granted if the processor executing program code and/or a moderator do not flag the video and audio data for inappropriate content. The video server transmits the video and audio data over the network for display within the expanded advertisement.

In accordance with yet another implementation, the invention is directed towards a system for recording video into an HTML framework. The system according to the present implementation comprises a user computing device comprising a processor, a memory, a display and at least one video and audio hardware component and a video server. The system further comprises a media recorder operatively configured by the processor to record video and audio data, wherein the media recorder has one or more interactive controls for initiating and stopping the recording of the video and audio data presented as part of a video recording user interface. A digital asset having one or more interactive elements and in connection to the media recorder is presented on the user computing device. The user computing device receives the digital asset from the video server over the network and, in response to interaction with a given interactive element from the one or more interactive elements, automatically expands the interactive element to present the video recording user interface having one or more videos for playback. A user can record and submit video and audio data to the digital asset via the video recording user interface for encoding by the media recorder.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 11 presents example advertisement program code according to one or more embodiments of the present invention;

DETAILED DESCRIPTION OF THE INVENTION

Figure 1:
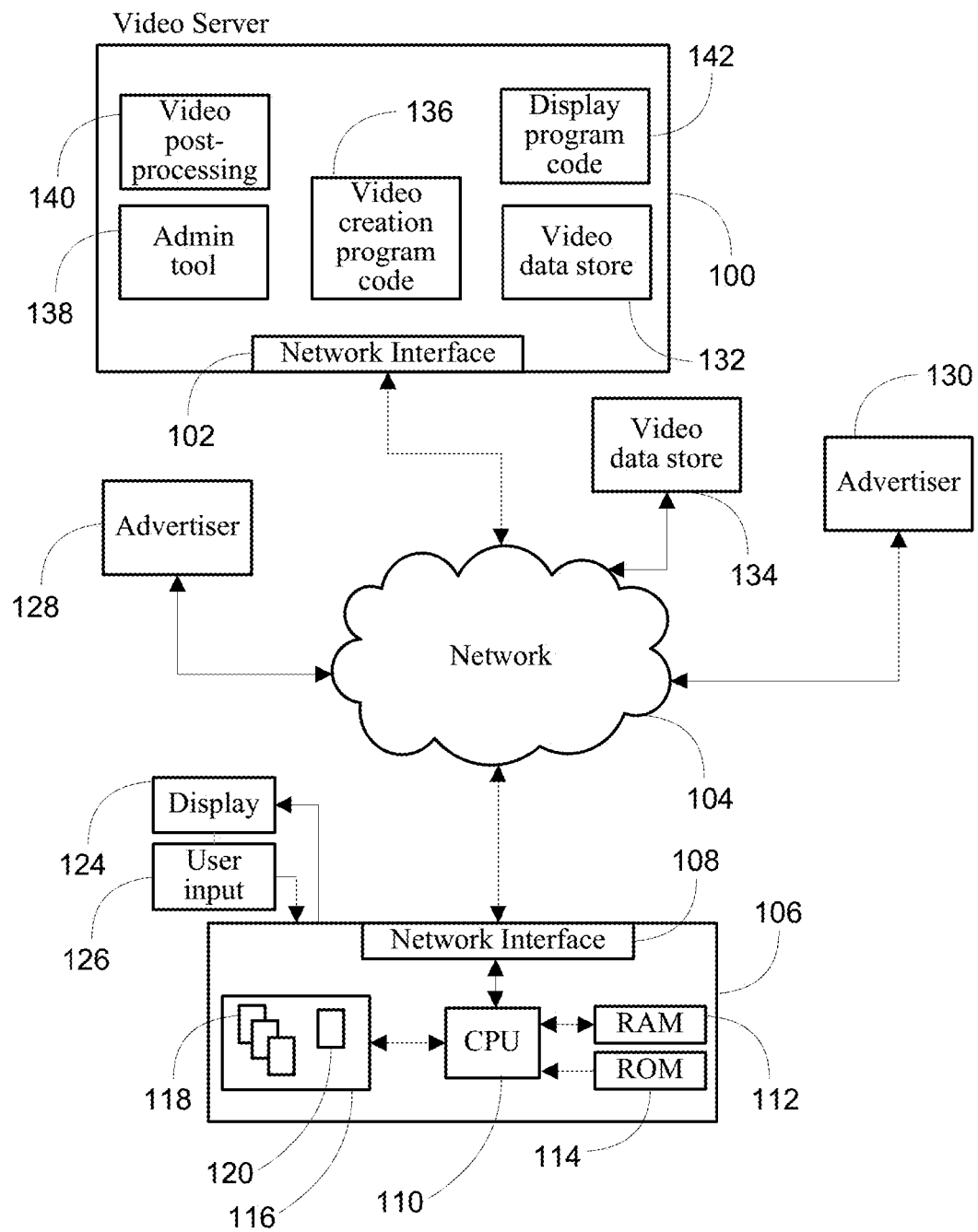
FIG. 1 presents a block diagram illustrating a system for providing video comments to a digital asset according to one or more embodiments of the present invention.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. Similarly, the phrase "one or more implementations" as used herein does not necessarily refer to the same implementation and the phrase "at least one implementation" as used herein does not necessarily refer to a different implementation. The intention is, for example, that claimed subject matter include combinations of example implementations in whole or in part.

One or more implementations of the present invention provide video commenting systems and methods for recording, viewing, transmitting, processing, moderating, and distributing user submitted video comments directly into a HTML framework. In or more implementations, a user navigates to a digital asset, such as a web page having program code that enables the recording, playback, storage and transmission of user videos. The digital asset as a whole may be the interactive portal for the video commenting system and method, or various embodiments may practice the systems and methods described herein through particular elements of a digital asset, such as through interactive and expandable advertisements. For example, a web page or similar digital asset may display an advertisement for a given product that invites a user to select the advertisement. In doing so, the user can then record and upload a video relating to that advertisement directly through the web page, without any additional software or hardware beyond traditional and typically present computer peripherals, such as cameras and microphones. Once satisfied with the recorded video content, the user may then submit the video through the digital asset to a video server. According to various embodiments. the video commenting systems and methods of the present invention process video to analyze its content, which the advertiser may then moderate, automatically, manually or in accordance with combinations thereof, in order to determine whether the video should be made available for public distribution through the advertisement. If advertiser approves the user submitted video, the system makes the video available through the advertisement, e.g., an advertisement user interface, such that when other users select the advertisement, he or she can view the newly submitted video.

Data transmission in accordance with embodiments of the invention overcomes a problem rooted in web design. Specifically, in frameworks such as HTML, CSS, or JAVASCRIPT, interactions between a client device and a server over a local or other network lack a uniform approach to record, upload, process, view, and moderate video within such frameworks and fail to function within a variety of computing environments, e.g., mobile and desktop web browsers (e.g., CHROME, FIREFOX, INTERNET EXPLORER, etc.). Because user interaction with a server through a digital asset occurs in different ways depending on the particular computing environment chosen, e.g., framework and browser, there lacks a universal manner in which web designers may embed interactive video commenting components within typical web pages.

Embodiments of the invention does not merely utilize a computer to incorporate the recording, uploading, processing, and viewing of video content, but rather improves various HTML frameworks known to those of ordinary skill in the art by solving a computer specific problem: the lack of universal systems and methods of recording, uploading, processing, viewing, and submitting of video content across any HTML framework. Further, the invention provides the improvement of uniform user video commenting systems and methods for implementation through interactive digital asset elements, such as advertisements, regardless of HTML framework, user device, or browser.

FIG. 1 presents a block diagram illustrating a system for providing video comments to a digital asset (e.g., web pages, banner advertisements, downloadable applications, remote applications, etc.) according to one or more implementations of the present invention. The system 100 includes a video server 101 that has a first network interface 102 communicatively coupled across a communication network 104 to one or more user computing devices 106 with a second network interface 108. In addition, the second network interface 108 can provide physical connectivity to the network for the user computing device 106, which may also include a wireless link for the physical layer, and may assist the user computing device 106 in managing the transmission of data to and from the network 104, e.g., ACK transmission, retransmission requests, etc. The video server 101 and user computing device 106 can comprise, for example, mobile computing devices such as tablet computing devices, smartphones, personal digital assistants or the like, as well as laptop computers and/or desktop computers. Further, the video server 101 and the user computing device 106 may be configured as one computing device, depending upon operations be executed at a particular time.

Claimed subject matter covers a wide range of potential variations in user computing devices. The client computing device 106 comprises a processor 110, which is operatively connected to various hardware and software components that serve to enable operation of the systems and methods described herein. The processor 110 serves to execute instructions contained in program code, which instruct the processor 110 to perform various operations relating to recording, uploading, processing, viewing, and submitting video and audio data. The processor 110 can comprise multiple discrete processors, a multi-processor core, or other type of processor(s) known to those of skill in the art, depending on the particular implementation.

In accordance with one or more implementations, the client device 106 includes one or more of volatile and non-volatile memories, such as Random Access Memory ("RAM") 112, Read Only Memory ("ROM") 114, Flash, Phase Change Memory ("PCM") or other memory types. Such memories can be fixed or removable, as is known to those of ordinary skill in the art. The client device 106 further includes a persistent storage device 116, such as a hard disk drive, a flash memory, a rewritable optical disk, a rewritable magnetic tape, or some combination of the above. The persistent storage device 116 provides for storage of application program and data files at the client device 106, such as a video player application 120, as well as video and object data files 118, one or more of which may correspond to or be associated with the video files 120. The persistent storage device 116 can also be fixed or removable, as well as local to the client device or remote, for example, a cloud based storage device, or any combination of the foregoing. The user computing device 106 also includes a user interface ("UI") displayed on a display device 124 for user interaction with a digital asset accessed by the client device 106. User input peripherals 126 allow for the provision of input to the client device 106 by the user.

A user can navigate to the digital asset via a web browser or other digital interface using one or more input or output ("I/O") devices 126, which are provided to allow a user to provide input to, receive output from, and otherwise transfer data to and from the system. These I/O devices 126 may include a mouse, keypad or a keyboard, a touch panel or a multi-touch input panel, camera, network interface, modem, other known I/O devices or a combination of such I/O devices. The touch input panel may be a single touch input panel, which is activated with a stylus or a finger, or a multi-touch input pane activated by one or more fingers. The multi-touch panel is capable of distinguishing between two or more touches and is capable of providing inputs derived from those touches to the video server 101 and/or client device 106.

The I/O devices 126 and interfaces may include a connector for a dock or a connector for a USB interface, FireWire, etc. to connect elements of the system 100 with another device, external component, or a network, or a network. For example, a web-enabled user computing device 106, which may include one or more physical or virtual keyboards, mass storage, one or more accelerometers, one or more gyroscopes, global positioning system ("GPS") or other location identifying type capability, or a display with a high degree of functionality, such as a touch-sensitive color 2D or 3D display. A client device 106 may also include or execute an application to communicate content, such as, for example, textual content, multimedia content, or the like. A client device 106 may also include or execute an application to perform a variety of possible tasks, such as browsing, searching, playing various forms of content, including locally stored or streamed video, or games. The foregoing illustrates to those of skill in the art that disclosed subject matter includes a wide range of possible features or capabilities in client computing devices 114 that connect to the video server 100.

A client device 106 may also comprise or execute a variety of operating systems, such as a personal computer operating system, such as a Windows, Mac OS or Linux, or a mobile operating system, such as iOS, Android, or Windows Mobile, or the like. In addition, a user computing device 106 may comprise or may execute a variety of possible applications, such as a client software application enabling communication with other devices, such as communicating one or more messages, such as via email, short message service ("SMS"), or multimedia message service ("MMS").

A client device 106 may use the network 104 to initiate communication with one or more social networks, including, for example, Facebook, LinkedIn, Twitter, Flickr, or Google+, to provide only a few possible examples. The term "social network" refers generally to a network of individuals, such as acquaintances, friends, family, colleagues, or co-workers, coupled via a communications network or via a variety of sub-networks. Potentially, users may form additional subsequent relationships because of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network may include individuals with similar experiences, opinions, education levels or backgrounds. Individual control elements for interacting with social networks may be included at, for example, a UI shown at display 124.

Continuing with reference to FIG. 1, the video server 101 further comprises a processor (not shown), a memory (not shown), and various storage devices. The video server 101 comprises a video data store 132 for storing video data and object data. Such data can be transmitted to the video data store 132 over the network 104 from an outside video data store 134. In one or more implementations, the video data store 132 can be fixed or removable, as well as local to the client device 106 or remote, for example, provided by a cloud storage device, or any combination of the foregoing.

In one or more implementations, the video server 101 comprises one or more applications configured by executing program code stored in the memory or storage device that is provided to the processor. Video creation program code 136 provides instructions to the processor for loading a UI having video recording functionality. For example, the program code 136 can instruct the processor to generate a computer window on the user computing device 106 having selectable interactive elements for recording and playing back video. An administrative tool 138 can be included that provides instructions to the processor to display UI elements for moderating user-submitted videos. For example, the administrative tool 138 can comprise UI elements for approving videos to post to the digital asset or for deleting submitted videos.

A video post-processing tool 140 receives user submitted videos and processes such video data by downloading the video and audio data submitted. According to one embodiment, the video post-processing tool 140 separately extracts and encodes the video and audio data, performing subsequent analyses on the separate data in order to prepare the video for moderation or display through a digital asset, e.g., a web page or advertisement provided thereon. For example, the post-processing tool 140 can perform a speech to text analysis on the submitted audio data, parsing the output for specified terms (e.g., a blacklist) and then flagging those videos containing such terms as unavailable for display on the digital asset. Similarly, the post-processing tool can perform an image analysis on the video data to flag for unacceptable image submissions, e.g., those including nudity or sexually explicit content. The video server 101 can further comprise display program code 142 that instructs the processor to output UI elements on a display. In one or more implementations, the display program code 142 comprises instructions to transfer video and audio data over the network 104 via the first network interface 102 to the client device 106 for display on a user's display 124 output (e.g., a monitor, tablet or phone screen, etc.).

In one or more implementations, the system 100 can comprise one or more advertisers (128, 130). An advertiser can provide advertisements over the network 104 to the video server 101 for use within digital assets. For example, an advertiser provides an interactive advertisement to a digital asset through a web design framework, in which a user can expand the advertisement to display a video creation UI. One or more of the elements included within the video server 101 generate such a video creation UI. A user can record, upload, process, view, and submit videos within an expandable advertisement. In one or more implementations, the advertisers (128, 130) provide additional content that accompany the recording, uploading, processing, viewing, and submitting video process, such as tower or static advertisements within an expanded version of the advertisement.

Figure 2:
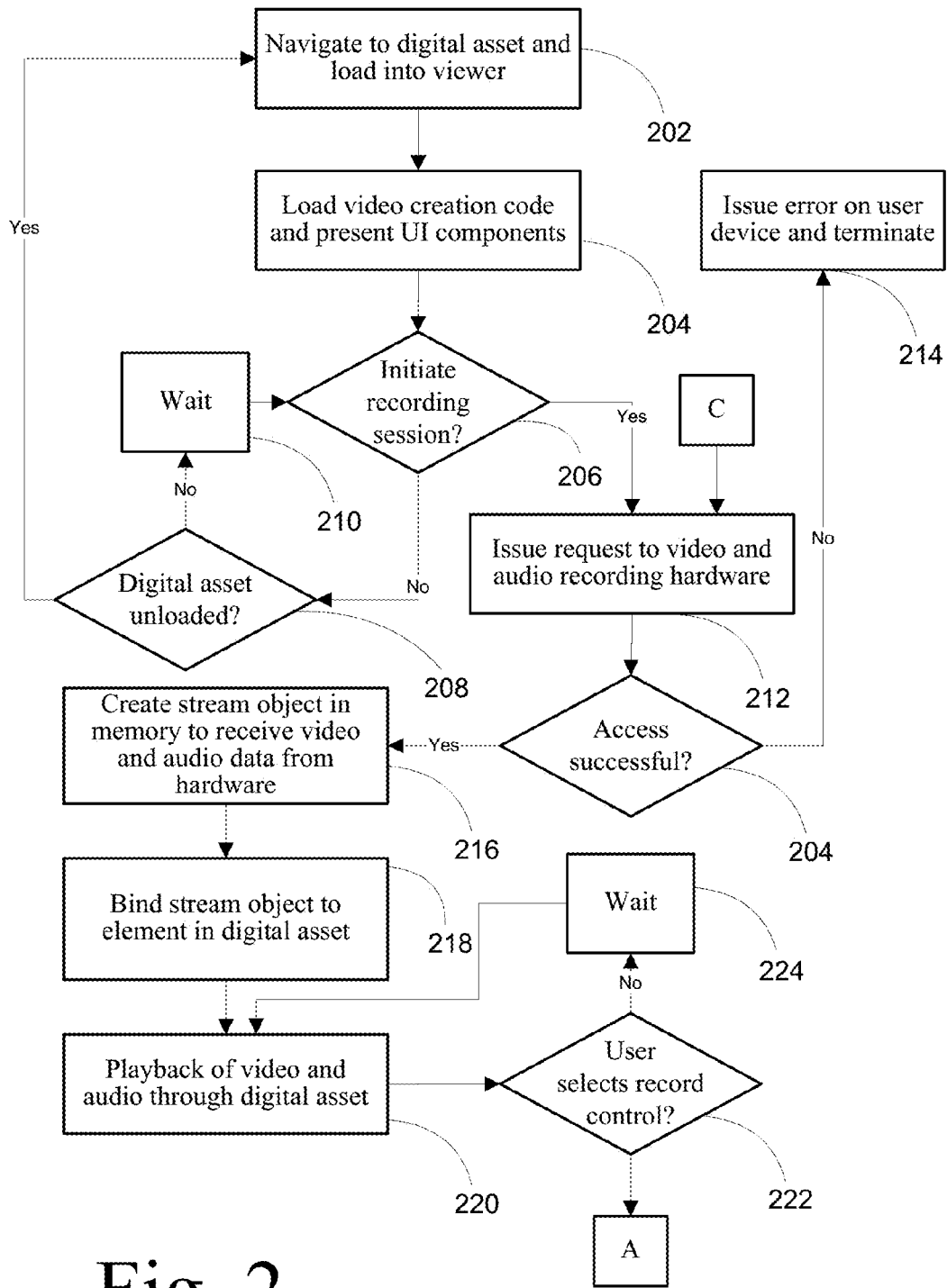
FIG. 2 presents a flow diagram illustrating a method for providing video comments to a digital asset according to one or more embodiments of the present invention.
Figure 3:
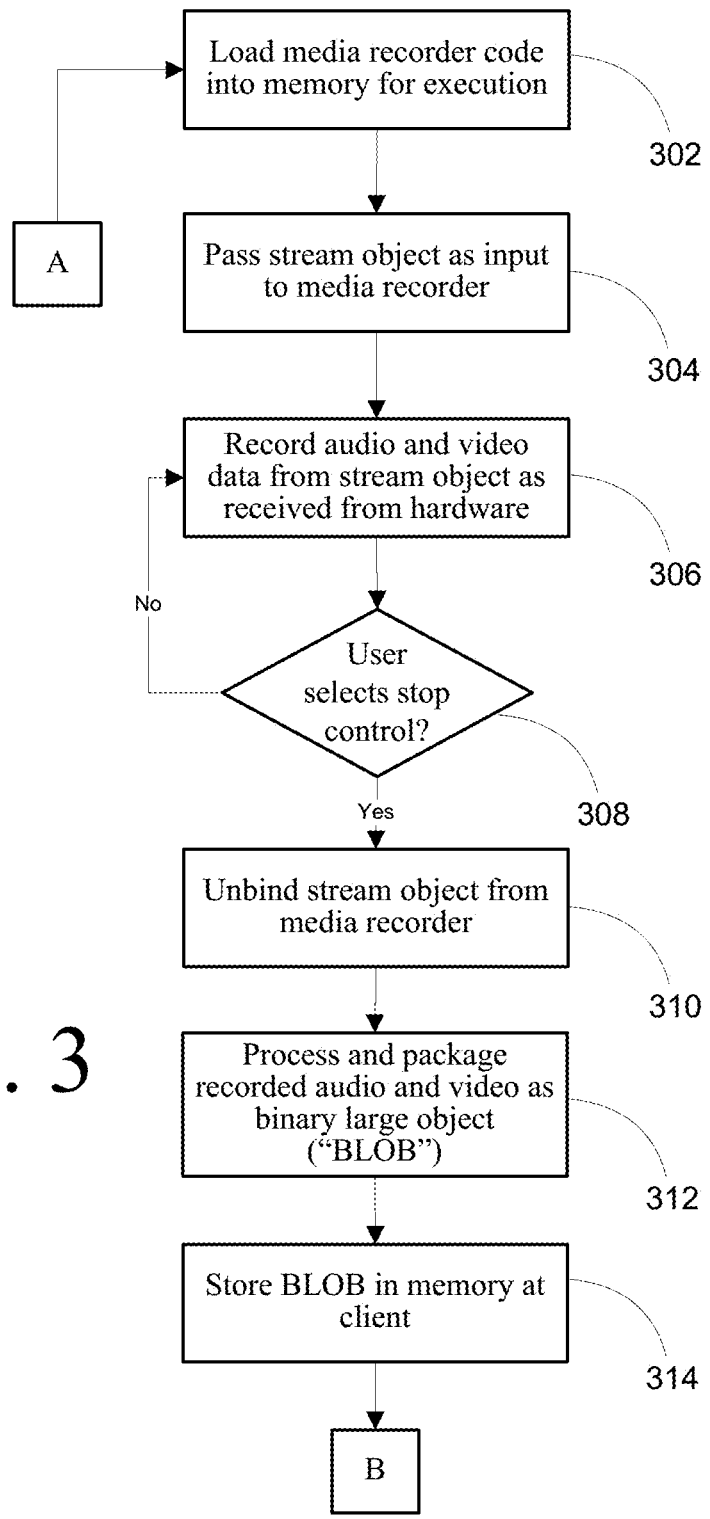
FIG. 3 presents a flow diagram illustrating a continuation of the method for providing video comments to a digital asset according to one or more embodiments of the present invention.
Figure 4:
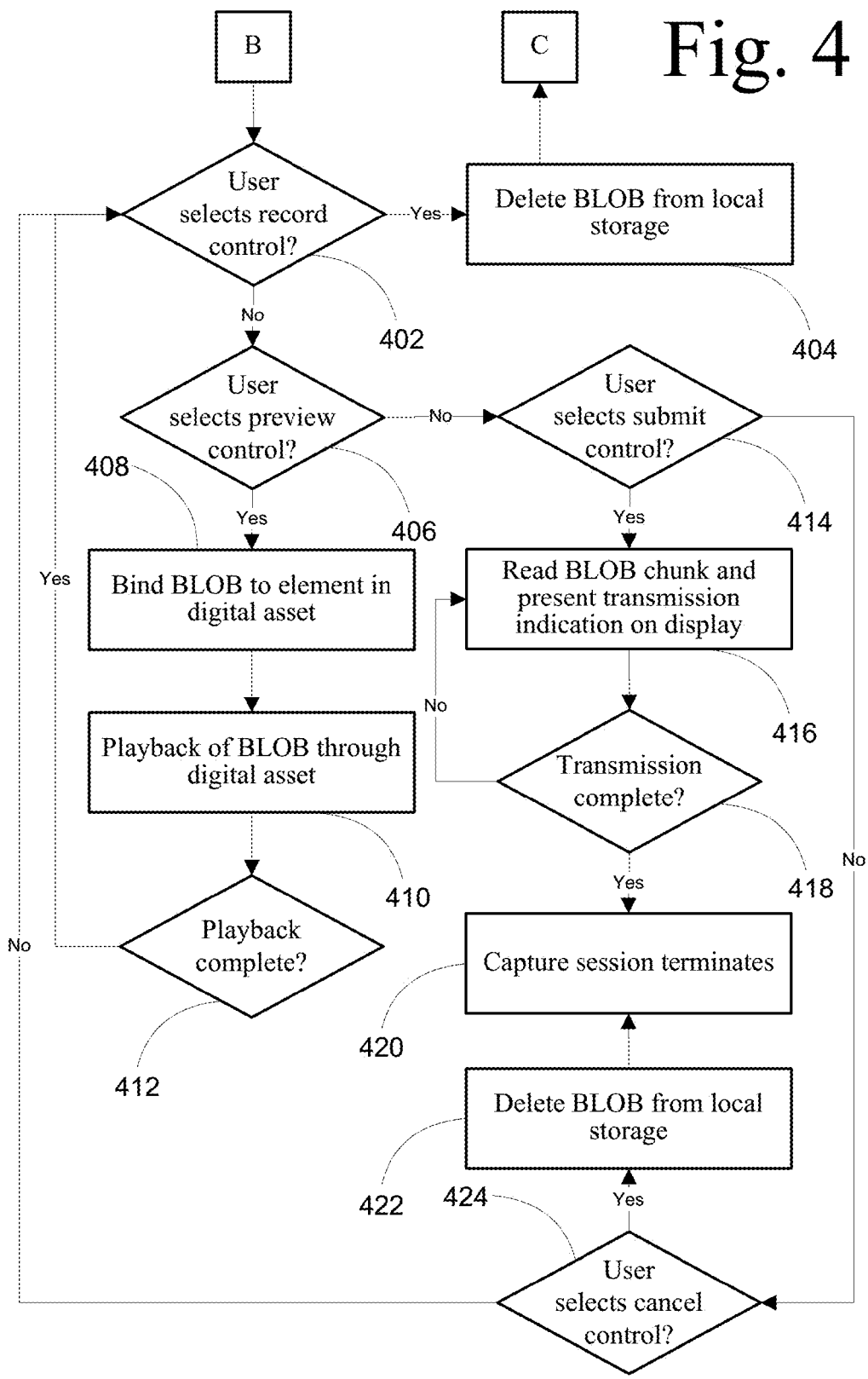
FIG. 4 presents a flow diagram illustrating a further continuation of the method for providing video comments to a digital asset according to one or more embodiments of the present invention.

FIGS. 2 through 4 are flow diagrams illustrating an exemplary method for recording and submitting video comments through a digital asset. In one or more implementations, users provide video comments to a video server utilizing one or more user computing devices (also referred to herein as "client devices") to transmit video over a network for inclusion with a digital asset (e.g., a web page coded in an HTML framework). More specifically, a processor located at the user's computing device (e.g., processor 110 in FIG. 1), executes program code located in the web page's framework to instruct the client device to perform steps described by method of FIGS. 2 through 4. Such program code comprises initiating a recording session and then binding video data to a video stream in for transmission across a network. Prior to transmission, the video data is processed and packaged as binary large object ("BLOB"). The user can play back or re-record the BLOB at the client device. Then, a user can elect to transmit the BLOB to the video server for post-processing and moderation, or the user can elect to cancel the submission in the method, thereby deleting the BLOB.

With reference to FIG. 2, the method begins at step 202, in which a user navigates to a digital asset wherein a processor at a client device executes program code to load and render the digital asset into a viewer. For example, if a user navigates to a digital asset such as a web page via a web browser, the digital asset loads into a viewing window on a display at the client device. In one or more implementations, the digital asset comprises images, multimedia, and/or textual content, which the viewer may retrieve from across a plurality of files. For example, the digital asset can comprise interactive media elements, such as expandable advertisements or video windows embedded within a web page. At step 204, the processor processes video creation code provided by the HTML framework of the digital asset to present user interface ("UI") components at the client device. For example, the UI components can comprise one or more expandable windows having interactive controls for recording or viewing user submitted videos.

At step 206, the processor determines if the user has initiated a recording session. In one or more implementations, the recording session initiates if a user selects a record control that the processor presents in response to executing relevant program code. If the user has not initiated a recording session, then at step 208, the processor determines whether the digital asset has been unloaded. For example, the digital asset unloads if the user selects an exit control on the digital asset or otherwise navigates away from the digital asset. If the digital asset has been unloaded, then program flow returns to step 202 and reiterates if the user navigates back to the digital asset, or navigates to a subsequent digital asset. If the user fails to unload the digital asset, the method waits at step 210 until a user initiates a recording session, step 206, or otherwise does unload the digital asset, step 208.

Continuing with reference to FIG. 2, if a user initiates a recording session, step 206, then program flow branches to step 212, which causes the processor to issue an access request to video and audio recording hardware located at the user computing device. For example, the video and audio hardware may be a camera and/or microphone, which may be external or provided as part of the client device. The processor, executing video creation program code, determines whether access to the video and audio hardware was successful, step 213. If hardware access was unsuccessful, e.g., the user computing device denies hardware access or lacks compatible recording hardware, the processor issues an error on display of the user computing device and terminates the process, step 214. If hardware access is successful, the processor executes program code to create one or more stream objects in memory, step 216. A stream object represents a binary stream of video and/or audio data received from the user computing device hardware, such as a camera and/or microphone.

At step 218, program code instructs the processor to bind the one or more stream objects to an element in the digital asset, such as binding the stream object to a video element on a web page. Thereafter, at step 220, the user can initiate video and audio playback of previously recorded video through the digital asset. For example, such video can comprise a lead video set to display on the UI when a user first accesses the digital asset. At step 222, program code executing at the processor instructs the processor to determine whether the user has selected a record control on the UI. According to various embodiments, the UI can comprise one or more controls for facilitating the recording process, such as record controls for recording audio and video data, preview controls for initiating A/V playback of recorded multimedia prior to submission, submission controls for submitting audio and visual data to a video server over a network, and cancellation controls for deleting previously recorded visual and audio data. If the user has not selected a record control, then the program flow waits at step 224 until a user selects a record control or navigates from the digital asset. During this time, the user can initiate playback of available recorded video and audio through the digital asset.

Turning now to FIG. 3, if the user selects a record control, program flow advances to step 302, causing the processor to load program code for a media recorder into memory for execution. At step 304, the processor passes the previously created stream object as input to the media recorder. According to certain embodiments, the input can be one or more stream objects. At step 306, program code executing at the processor instructs the media recorder to record video and audio data from the video and audio recording hardware. For example, the source of such video and audio data can be from the one or more stream objects as received from the video and audio recording hardware at the client device. The processor then assesses input to determine whether a user has selected a stop control on the UI that the processor presents on the client display device.

If the user has yet to select the stop control, then the media recorder continues to record video and audio data up, which may continue for a specified time or until reaching a maximum file size, which the media recorder program code (or a resource file associated therewith) may specify. For example, the program code can limit recording length to thirty seconds to maintain manageable file sizes. If the processor determines that the user has selected the stop control, step 308, the processor executes to unbind the one or more stream objects from the media recorder, step 310. This ends or otherwise concludes the given user recording session. The recorded video and audio is made available for processing and packaging, step 312. For example, the video and audio can be processed and packaged as a binary large object ("BLOB"). Reference herein to the processed video and audio is as a BLOB, but those of ordinary skill in the art recognize that such data can be stored in a number of other formats suitable for storing binary data. The BLOB is stored in the memory at the client device, step 314.

The method of FIGS. 2 and 3 continues with FIG. 4, in which program code executing at the processor determines whether the user has selected the record control a subsequent time, step 402. If the user again selects the record control, processor causes deletion from local storage of the BLOB currently in memory, step 404, and program flow loops back to step 206, at which point the processor again restarts the recording session. If the processor determines that the user has not selected the record control, the processor then determines whether the user has selected a preview control on the UI. If the processor determines that the users selects a preview control, the processor executes program code to bind the BLOB to an element (e.g., a video element) of the digital asset, step 408. At step 410, the processor instructs the digital asset to playback audio and video data contained within the BLOB to the requesting user. As playback commences, the processor determines whether playback has concluded. For example, playback concludes if the entire video contained in the BLOB has been played out to the user, or if the user halts playback such as by selecting the preview control during playback, or by selecting a pause control. If playback of the audio and video data contained within the BLOB has concluded, then program flow loops back to step 402. If playback has not concluded, program flow loops to step 410 to continue playback of the audio and video data.

If the processor determines that the user has not selected the preview control at step 406, however, then program flow branches to step 414, in which the processor determines whether the user has selected the submission control to submit the video for post-processing, moderation and eventual distribution (which may comprise distribution in conjunction with the digital asset). In one or more implementations, selection of a submission control, step 414, uploads the recorded video and audio data to a video server over a network. In one or more implementations, a submission control uploads the recorded video and audio data to a local storage.

If the processor determines that the user selects the submission control from a user interface that the processor presents on the display device, step 414, the processor reads the video and audio data contained in the BLOB, transmitting the BLOB to a video server (e.g., a data upload), step 416. In one or more implementations, as the data is transmitted to the video server, program code instructs the processor to present a transmission indicator at the client device, which may comprise display in conjunction with the digital asset. The transmission indicator can include a progress bar, a data transferred percentage indicator, or other UI element to indicate data transfer advancement as a function of time. At step 418, program code that the processor in executing instructs the processor to determine whether the data in the BLOB has completed transmission to a video server. If the transmission is not complete, step 418, then program flow returns to step 416, with transmission continuing until complete. In one or more implementations, program code instructs the processor to display a pop-up box or textual element indicating completion upon transmission completion, which may comprise the processor displaying such information in conjunction with the digital asset. If the transmission is complete, step 418, the recording session terminates and the method concludes, step 420.

Returning to step 414, if the processor determines that the user has not selected the submission control, program flow branches towards step 422, in which the program code executing at the processor causes it to perform a check to determine whether the user selects a cancel control on the UI. If the user has not selected a cancel control, then program flow loops to step 402. Where the user selects a cancel control, step 422, the processor executes program code instructing the local storage to delete the BLOB, step 424. Thereafter, the method terminates.

Figure 5:
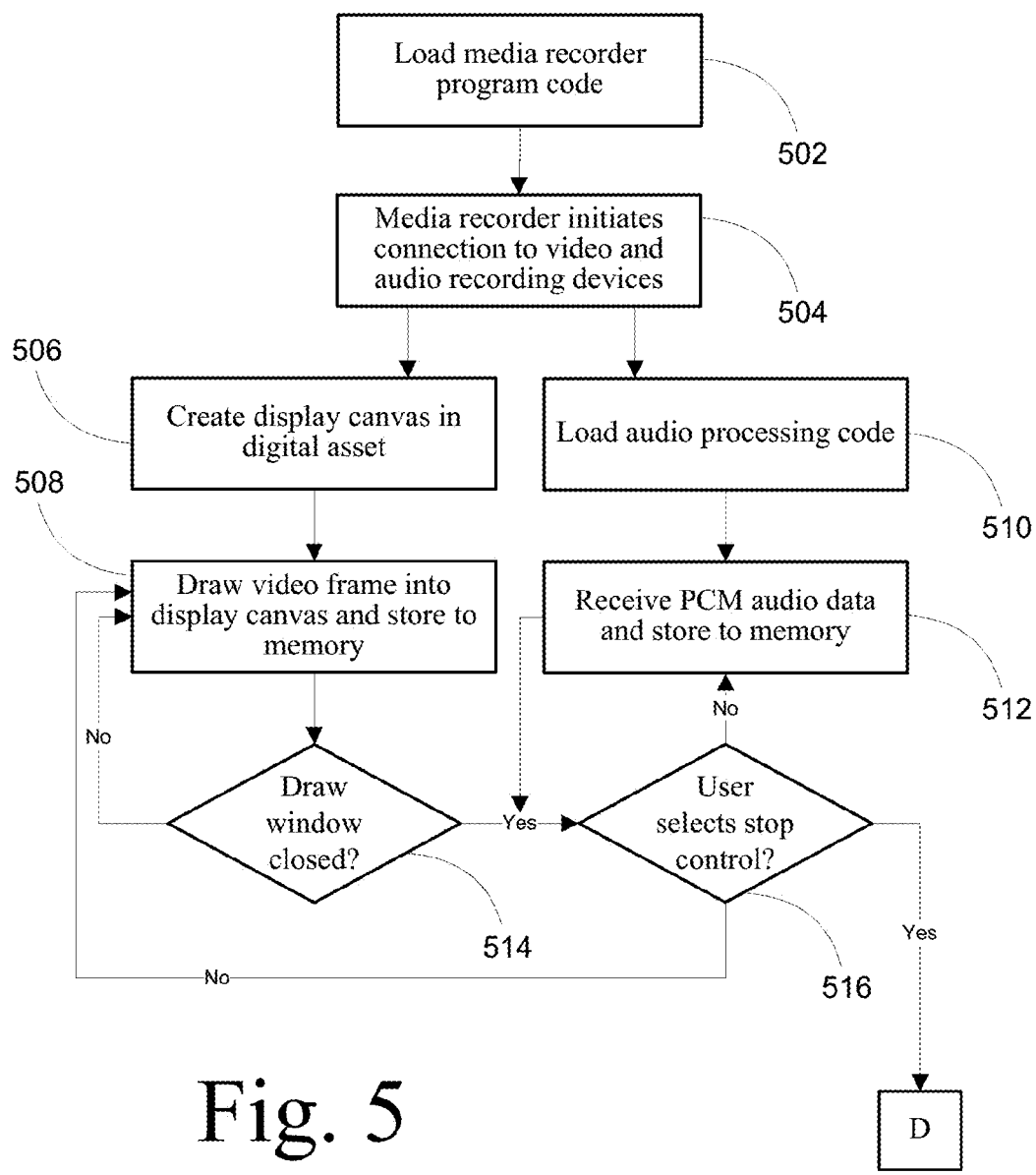
FIG. 5 presents a flow diagram illustrating an alternative method for providing video comments to a digital asset according to one or more embodiments of the present invention.
Figure 6:
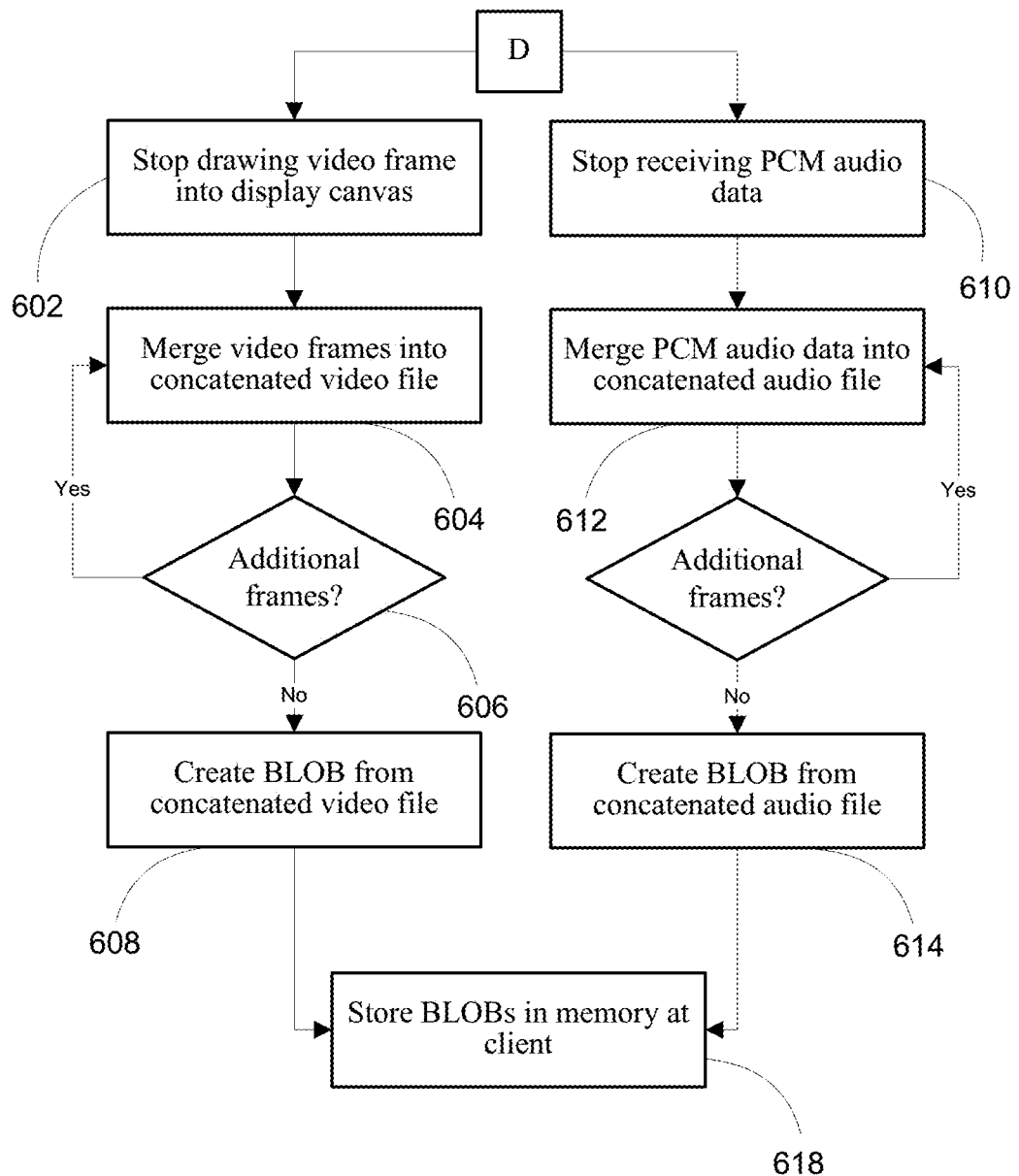
FIG. 6 presents a flow diagram illustrating a continuation of the alternative method for providing video comments to a digital asset according to one or more embodiments of the present invention.

FIGS. 5 and 6 present flow diagrams that illustrate an exemplary alternative technique for providing video comments to a digital asset in accordance with one or more implementations disclosed herein. In accordance with the exemplary method that FIGS. 5 and 6 illustrate, a processor executes program code to load a media recorder into a digital asset. The media recorder connects to video and audio hardware located at a client device and records separate video and audio data for storage in a memory. In one or more implementations, program code instructs the processor to perform the method in accordance with software executing at a client device, such as a web browser, that connects to a web server to retrieve a digital asset for display on a web page through the web browser. For example, a user can access a HTML encoded web page via a browser (e.g., Google Chrome™) in order to interact with a web page element (e.g., an advertisement) for the purpose of recording and submitting a video in response to that web page element (e.g., a video comment). As the client device records video and audio data, the video data is drawn onto a display canvas and the audio data is stored correspondingly. The program code instructs the processor to merge the video and audio data into concatenated files, thereby creating a BLOB for storage in a memory at a client device or other computing device, which may comprise the use of local storage, remote storage or combinations thereof.

Referring now to FIG. 5, the method beings at step 502, with a processor executing program code loading a media recorder into a digital asset. At step 504, the processor instructs the media recorder to initiate a connection to video and audio recording devices with which the client device is in communication. In one or more implementations, the video and audio recording devices are located at a client device, e.g., integrated, but client device may also utilize external peripherals. For example, the devices can be a web camera on a desktop or laptop, or cameras and microphones on a mobile device. In one or more implementations, a video and audio recording session initiates herein. At this point, program flow branches into two parallel tracks, one to manage video data and one to manage audio data, which may execute serially or in parallel. In one or more implementations, the method manages these each track substantially simultaneously. First contemplating the video recording branch, the processor executes program code to create a display a canvas within the digital asset at step 506. A display canvas functions within an HTML framework to generate a drawable region defined by HTML code to have particular height and width attributes. Within a display canvas is a drawing surface that by default is equal in size to the display canvas, though one of ordinary skill in the art recognizes that modification can be made to the code to provide a drawing surface of a smaller size than the display canvas. The processor draws video frames onto such a canvas in succession to create video playback.

At step 508, the media recorder receives video data, program code instructs the processor to draw a video frame into the display canvas, as well as instructs the processor to store the video data in the video frame to memory. As recording continues, additional video data is stored into successive video frames. If the processor determines that the video draw window remains open, step 514, then program flow returns to step 508 with the processor continuing to draw and store video frames. Executing in a parallel audio capture process, the processor executes program code to load audio processing in the digital asset at step 510. The media recorder receives pulse-code modulation ("PCM") audio data and the processor stores such audio data to memory, step 512. If the processor determines in step 514 that the draw window is closed, however, and PCM audio data has been received, step 512, the processor determines whether the user has selected a stop control on the digital asset, step 516. If the user has not yet selected a stop control, step 516, the media recorder continues to record PCM audio data, step 512, as well as, draw and store video frames, step 508.

Continuing the method with reference to FIG. 6, if the user selects a stop control, then the method of managing the video and audio tracks continues by ceasing reception of video and audio data and merging received data into concatenated files. The video branch of the program flow continues at step 602, in which the processor instructs the media recorder to stop drawing video frames into the display canvas. Conclusion of the capture of video data causes the processor to merge stored video frames into a concatenated video file, step 604. The processor determines whether there are additional frames to merge at step 606, and if so, the processor merges the additional frames into the concatenated video file created in step 604. In one or more implementations, the method links the video frames together in the order that they were received and stored. If the processor determines there are no further video frames, then, at step 608, the processor creates a BLOB from the concatenated video file.

Processing of the audio track continues at step 610, in which the processor instructs the media recorder to stop receiving PCM audio data from the audio recording hardware. The processor merges the stored PCM audio data into a concatenated audio file, step 612. The processor further determines whether there is additional audio data to merge at step 613, and if so, the processor merges the additional data into the concatenated audio file created in step 612. In one or more implementations, the method links the audio data in the order that it was received and stored. If there is no further audio data, then, at step 614, the processor creates a BLOB from the concatenated audio file. Program code then causes the processor to instruct the memory to store video and audio BLOBs at the client device, step 618. For example, the BLOBs are stored at a video server associated with the digital asset (e.g., the web page or interactive advertising element present on the web page).

In one or more implementations, provided herein are systems and methods applicable to mobile computing devices. Mobile and tablet users are acutely affected by the restrictions imposed by the smaller display space available to displays integrated into such devices, as well as the recording functionality available to such devices. In one or more implementations, video recording and submission systems and methods disclosed herein can be implemented on mobile platforms without requiring the download of a mobile application ("app"). For example, a user can navigate with a mobile device to a digital asset having a HTML framework for the video recording and submission methods as described herein and can record and upload a video through the digital asset, regardless of mobile device operating system (e.g., phones using iO0053™, ANDROID™, etc.) or the type of browser (e.g., ANDROID™ CHROME™, SAFARI™, etc.).

Figure 7:
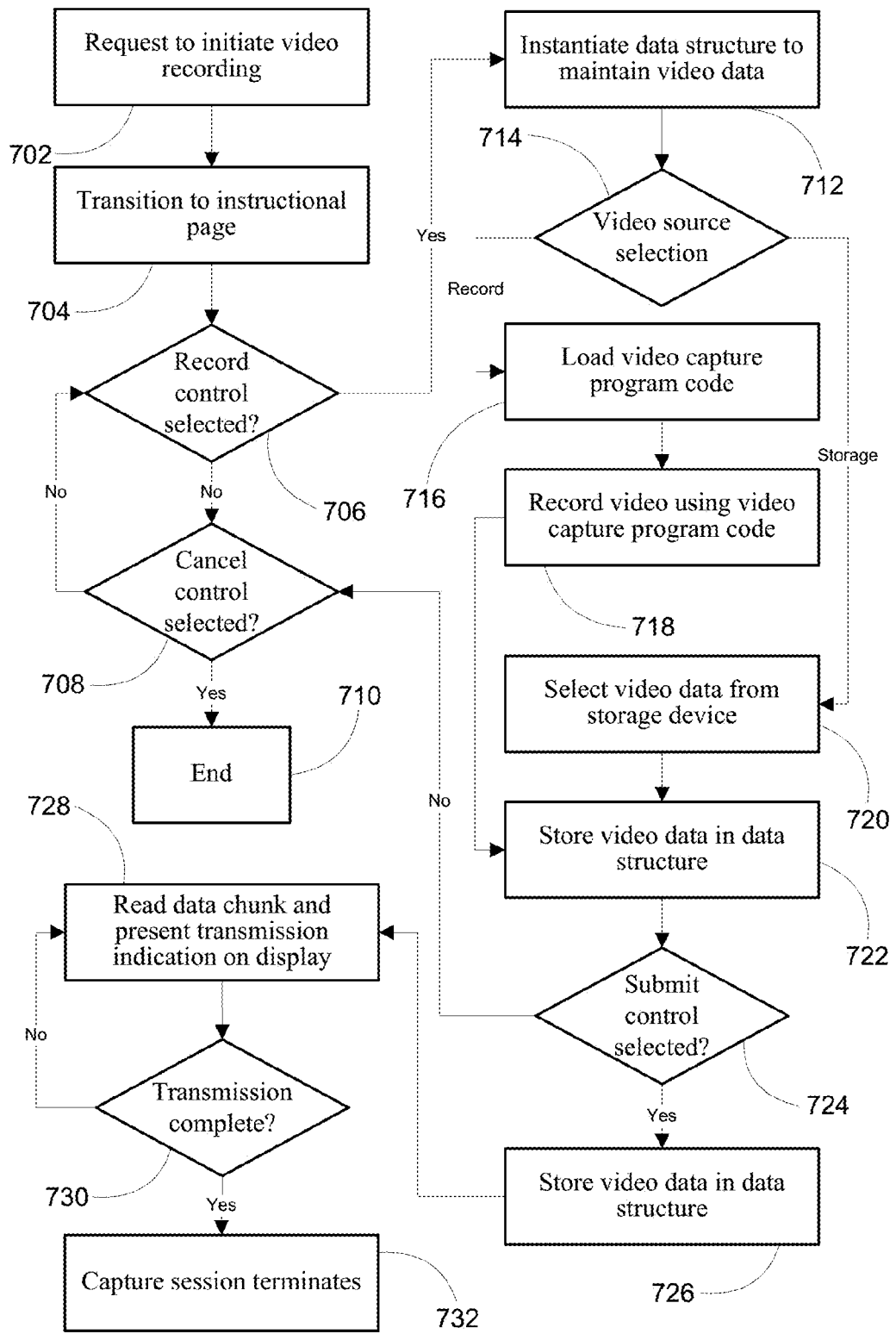
FIG. 7 presents a flow diagram illustrating a method for providing video comments to a digital asset through use of a mobile device according to one or more embodiments of the present invention.

With reference now to FIG. 7, the method begins at step 702, in which a user sends a request to initiate video recording. In one or more implementations, the user selects an element, such as an expansion control or an advertisement, located within a digital asset presented in a mobile format in order to request video recording initiation. A processor at the client device, which according to the present embodiment is a mobile device, instructs the digital asset to transition the user to an instructional page, step 704. In one or more implementations, the instructional page includes interactive UI elements for controlling the recording process. For example, the UI elements include record controls, cancel controls, and/or submission controls. At step 706, the processor determines whether a user has selected a record control. If the user has not selected a record control, then the processor determines whether a user has selected a cancel control at step 708. In one or more implementations, the cancel control includes title bar buttons, such as a close window button, and/or includes a user selection of an area outside of the digital asset. Similarly, if the user navigates from the digital asset, then the processor behaves or otherwise interprets such action as if the user selected the cancel control. If the processor determines that a cancel control has been selected, then program flow progresses to step 710 and the method terminates. In one or more implementations, termination includes deleting any captured video and audio data. If the cancel control has not been selected, then program flow loops back to step 706 with the processor performing a subsequent checks to determine if the record control has been selected. The method iterates in this manner until the user decides to record a video or cancel the recording process.

Continuing with reference to FIG. 7, if the processor determines that the record control has been selected, program flow is directed to step 712, in which the processor instantiates a data structure for maintenance of incoming data from the user. For example, such a data structure can maintain video data. In one or more implementations, processor instantiates the data structure locally for temporary storage of video data. The method at step 714 determines what video source to select, such as whether to record a new video at the client device or to use video previously stored at a storage device, which may be a storage structure that is integrated into the client device or located remotely, such as across a network. In one or more implementations, the storage device is located at the client device or a remote video server.

Where the processor determines that video source selected is newly recorded video, then the processor executes program code to load video capture in the digital asset, step 716. In one or more implementations, the video capture accesses video and audio recording hardware on the client device, such as a mobile camera and microphone. At step 718, the processor instructs the video and audio recording hardware to record video using the video capture program code. Recorded video data is then stored in the previously instantiated data structure, step 722. If the processor determines the video source selected is to be previously stored video, however, then program flow branches towards step 720, in which the processor selects the video source as previously recorded video data from a video store. As with the alternative program flow branch, the previously recorded video data is stored in the data structure, step 722.

Thus, through a combination of user interaction and processor execution of program code, video data is stored in a temporary data structure, which may be local or remote to the client device. The user can playback the stored video data if desired. At step 724, the processor performs a check to determine whether the user selects a submission control. If the user does not select a submission control, then the program flow returns to step 708, where the processor performs a check to determine if the user selects a cancel control. If the user selects the submission control, however, then the video data is stored in a further data structure at step 726. In one or more implementations, this further data structure is located remotely from the local data structure. For example, the further data structure may be instantiated at a video server that includes one or more data structures for maintaining video data. At step 728, the processor reads and transmits the video data to a video server (e.g., a data upload). In one or more implementations, as the video data is transmitted to a video server, program code instructs the processor to display or otherwise present a transmission indicator on a display at the client device, which may be presented in conjunction with the digital asset. The transmission indicator can include a progress bar, a data transferred percentage indicator, or other UI element known to those of skill in the art to indicate data transfer advancement. At step 730, the processor determines whether the video data transmission is completed. If the transmission is not completed, then the program flow loops back to step 728. If the transmission is complete, however, the capture session terminates, step 732.

Various implementations of the present invention provide for back end post-processing of captured video. Such processing allows captured video and audio data to be analyzed and flagged according to various defined criteria. For example, if the digital asset provider solicits user videos in response to a particular advertisement or web page subject matter, then it is advantageous to automatically flag and/or make unavailable submitted videos that do not comport with the reasons for soliciting such user videos. In one or more implementations, captured video and audio data are separated from one another in order to analyze the respective data content under appropriate criteria. For example, audio data can be parsed to search for undesired speech terms or sounds, whereas video data can be parsed to search for undesired images.

Figure 8:
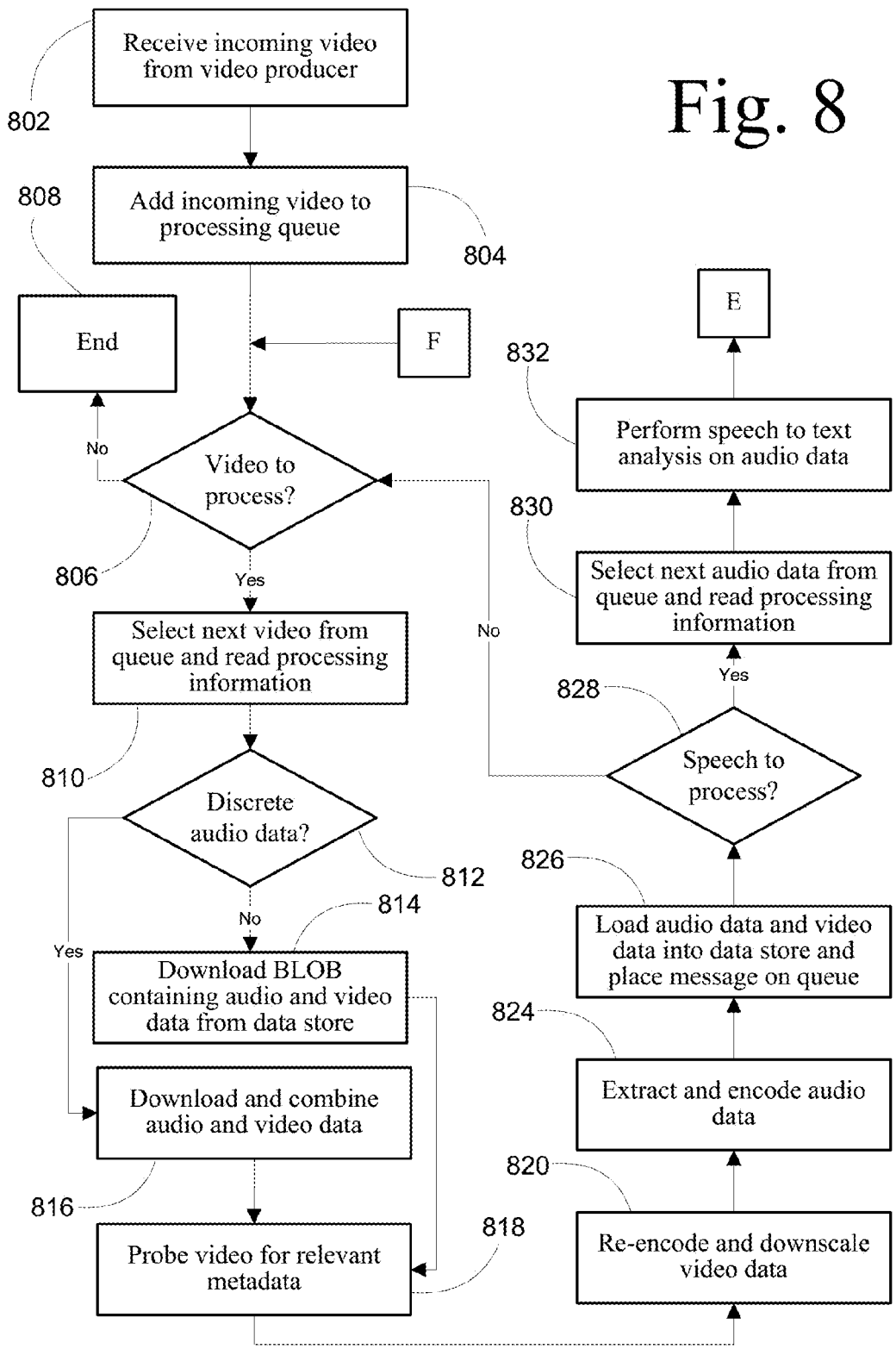
FIG. 8 presents a flow diagram illustrating a method for post-processing of video comments provided to a digital asset according to one or more embodiments of the present invention.
Figure 9:
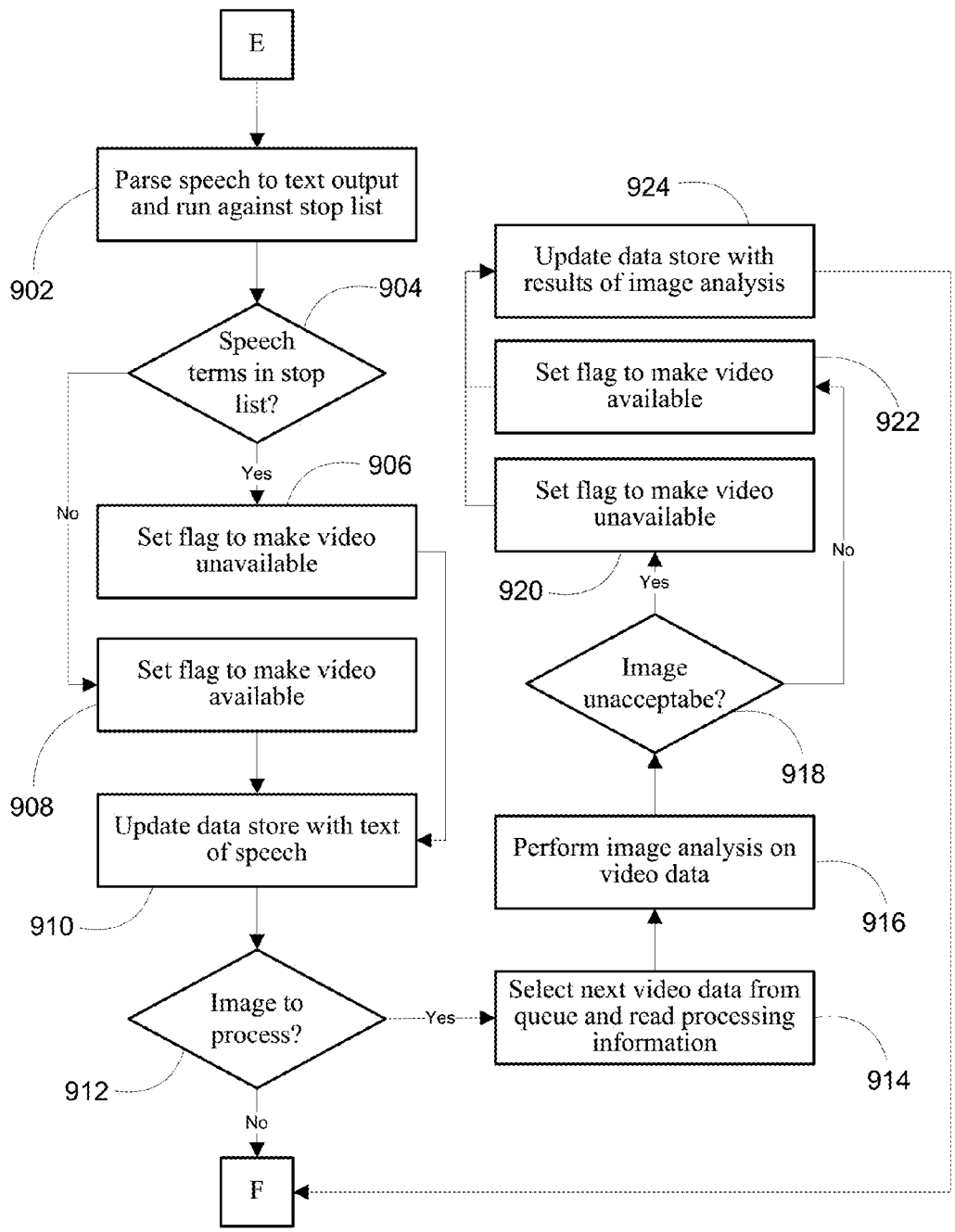
FIG. 9 presents a flow diagram illustrating a continuation of the method for post-processing of video comments provided to a digital asset according to one or more embodiments of the present invention.

FIGS. 8 and 9 present flow diagrams illustrating a method for post-processing of video comments provided to a digital asset according to one or more implementations of the present invention. With reference now to FIG. 8, the method begins at step 802, in which a video server receives incoming recorded video from a video producer. A processor at the video server adds the incoming video to a processing queue, step 804, and then determines whether there is a video in the processing queue that requires processing, step 806. If there are no videos in the processing queue, indicating that the video server has not received any videos for processing or that processing of all videos in the processing queue is complete, then the method ends, step 808. If there are one or more videos requiring processing, then program flow branches to step 810, in which the processor selects the next video in the queue to process. In one or more implementations, the processor reads the processing information associated with the video to be processed. For example, the processing information can include metadata such as video file size, type and length.

As illustrated by FIG. 8, the processor determines whether the selected video contains discrete audio data, step 812. If the video does not contain any discrete audio data, then the processor executes program code to download the BLOB containing the relevant audio and video data from a data store, step 814. If the video does contain discrete audio data, then at step 816, the processor executes to download and combine the discrete audio data and the video data. In either case, the processor probes the selected video for relevant metadata, step 818. For example, in addition to operationally gathered metadata (e.g., information pertaining to date and location of video creation, or file type, size, and length), a submitted video can include human-authored metadata, such as user "tags," textual audio transcripts, or description of the video content. Depending on the desired types of videos, guidelines can be set to filter videos win accordance with various combinations of particular items of metadata.

After locating relevant metadata, the processor re-encodes and downscales the video data, step 820. In one or more implementations, it is advantageous to re-encode and downscale the video data to reduce resource usage, such as reducing the data storage space necessary to store submitted videos or to improve transmission capacity. At step 824, the processor extracts and encodes the audio data. Separating the video data from the audio data in this manner allows for separate processing analyses that may be more appropriate for one type of data over the other. The processor loads the video data and the audio data into data stores, step 826, and further places a message on a queue for control of data transport in accordance with the present methodology. At this point in the program flow, the processor determines whether the audio data includes speech to process, step 828. If there is no speech to process, then the program flow branches to step 806 and determines whether the next video in the queue requires processing. If there is speech, however, the processor selects the next audio data from the queue, step 830. In one or more implementations, the processor reads the processing information associated with the audio data and executes program code to perform a speech to text analysis on the audio data, step 832, as well as output a text list. For example, the speech to text analysis can output a text list containing the words spoken in speech within the audio data.

Referring now to FIG. 9, the method continues at step 902, in which the processor executes program code to parse the output text list against a stop list. A stop list can comprise any defined terms that the digital asset holder wishes to avoid broadcasting publicly, such as expletives. At step 904, program code instructs the processor as to the manner in which to determine whether any of the parsed speech terms appear in the stop list. If the processor determines that one or more speech terms appear in the stop list, then at 906, the processor sets a flag to make the video containing the undesired speech unavailable for broadcast through the digital asset. On the other hand, if no speech terms appear in the stop list, step 904, then the processor sets a flag to make the video available for broadcast through the digital asset, step 908. In either case, program flow continues at step 910, in which the processor updates the data store with the speech text found in the audio data, which may be associated with the original audio file, video file or both. In one or more implementations, the speech text is available for secondary review by a moderator. Such review can discover additional unwanted speech terms or undesired combinations of speech terms not on the stop list, as well as correct any videos erroneously flagged as being unavailable for distribution.

In a similar manner to the audio data analyses, in one or more implementations, the method includes video image analysis in order to flag unacceptable visual submissions.

Continuing with FIG. 9, the processor determines whether the video data contains an image to process, step 912. This can include, for example, breaking the video data down frame by frame into individual images to analyze, which may comprise comparing visual imagery against a library of offending images, or utilize machine-learning techniques to discovery offending frames of video. If the processor finds no images to process for the current video in the processing queue, then program flow returns to step 806, in which the next video in the processing queue is processed. If the processor finds images to process in the current video, however, the processor selects the next item of video data from the queue, step 914.

In one or more implementations, the processor reads the processing information associated with the video data and executes program code to perform an image analysis on the video data, step 916, e.g., through the program code instructing the processor to perform a lookup of an image under analysis against some defined set of unacceptable images or image types. An unacceptable image may be one in which particular pixel distributions in the image resemble images that are undesirable to broadcast through the digital asset. Additional particular program code sets that perform image recognition in this matter, which are available commercially and are not fully described herein due to their familiarity to those of skill in the art, can also be utilized. At step 918, the processor determines whether an analyzed image is unacceptable. If the image is unacceptable, then at step 920, the processor sets a flag to identify the video containing the undesired image as being unavailable for distribution through the digital asset. If the check at step 918 indicates that the images appear acceptable, the processor can set a flag to identify the video as being available for distribution through the digital asset, step 922. In either case, program flow continues at step 924, in which the processor updates the data store with the results of the image analysis. In one or more implementations, the image analysis results are available for review by a moderator, which can discover additional unwanted images, as well as correct any videos erroneously flagged as unavailable for distribution.

As described herein, the digital asset can be an element within a web page, rather than an entire web page or web portal. For example, the digital asset can be an interactive element, such as an expandable window or other interactive element embedded within and distributed with a web page. In one or more implementations, this type of digital asset takes the form of an advertisement. For example, a web page can include a plurality of elements, one of which is an advertisement capable of expansion to display a UI upon user selection. Through access to program code that the advertisement's UI provides, a user can record, upload, process, view, and submit videos as described herein. In one or more implementations, an advertisement within a digital asset can include particular elements, such as preloaded videos or other unique identifiers or content.

Figure 10:
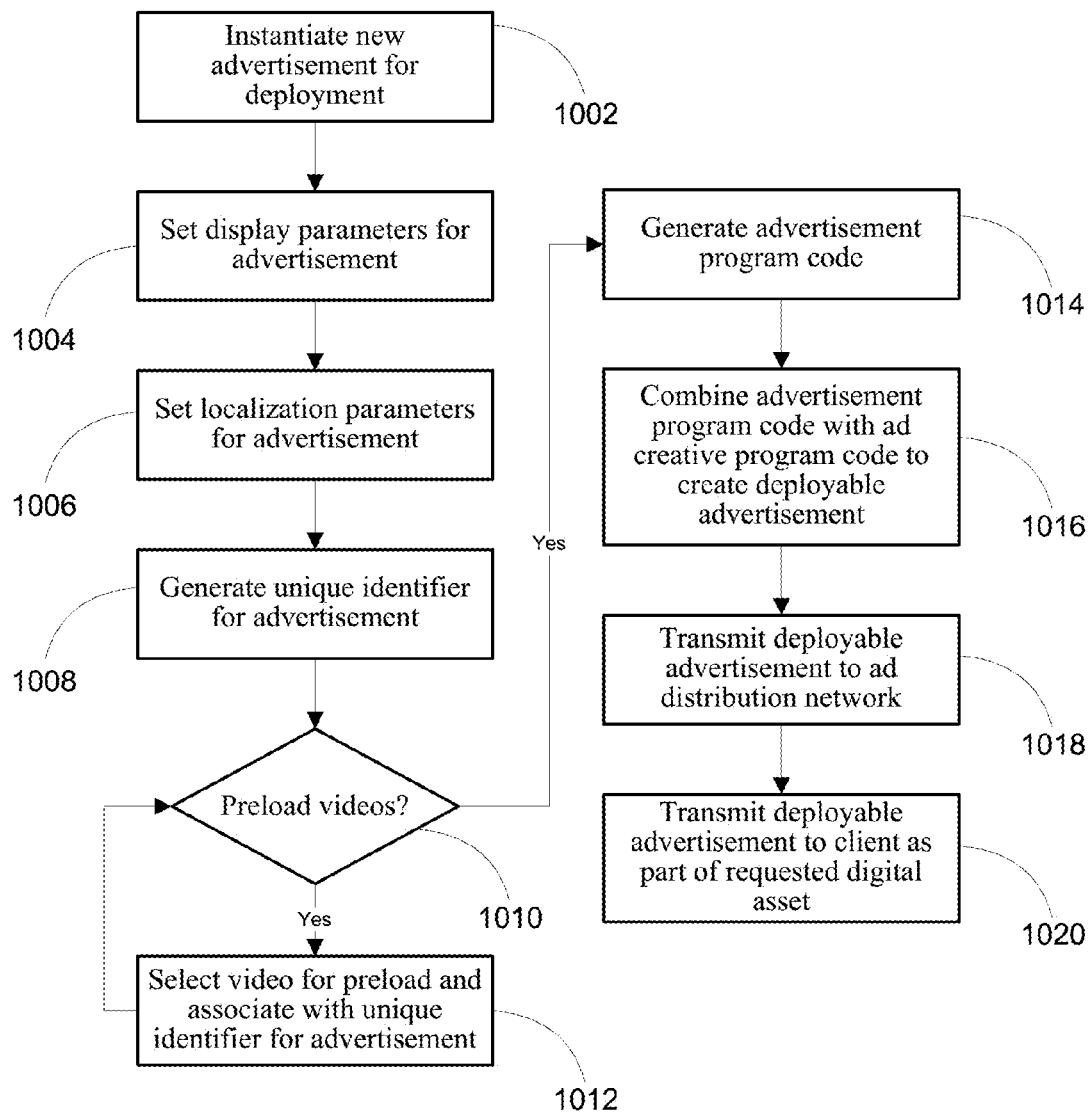
FIG. 10 presents a flow diagram illustrating a method for generating and deploying an advertisement that incorporates video comments according to one or more embodiments of the present invention.

FIG. 10 presents a flow diagram illustrating a method for generating and deploying an advertisement that incorporates video comments according to one or more implementations of the present invention. The method of FIG. 10 can include the recording, uploading, processing, viewing, and submitting steps substantially as described in one or more implementations elsewhere herein. The method begins at step 1002, in which program code executing at a processor instructs the processor to instantiate a new advertisement for deployment. Once instantiated, a user can instruct the processor to set display parameters (e.g., height and width) at step 1004, and to set localization parameters (e.g., location on a web page) at step 1006, for the advertisement. It should be noted, however, that such parameters can be loaded in an automated fashion, such as by the processor retrieving such input from resource files made available on local or remote disks. Based on the loaded parameters, the processor can generate one or more unique identifiers for the advertisement at step 1008. For example, unique identifiers can identify a specific web advertisement in order to deliver advertising content associated with the correct video comments.

At this point, program code instructs the processor to perform a check to determine whether videos have been identified for preloading into the advertisement, step 1010. If there are preloaded videos, step 1010, the processor selects a preloaded video for display in the advertisement, step 1012. For example, the preloaded video can be associated with the unique identifier for the advertisement. In one or more implementations, a preloaded video may be visible in the digital asset and/or be visible only if the advertisement is in an expanded state. Visibility may be limited to the presentation of a thumbnail representing the preloaded video comment. Program code then instructs the processor to perform a subsequent check to determine if there are additional preloaded videos to be displayed in the advertisement, iterating through steps 1010 and 1012 until all preloaded videos are selected. If there are no preloaded videos, or all of the preloaded videos are selected for display, the processor executes program code to generate the advertisement, step 1014.

In one or more implementations, the advertisement is generated as a static advertisement or a dynamic advertisement. For example, the advertisement can be a banner, semantic, affiliate, social networking, search engine marketing, and/or mobile advertisement. At step 1016, the processor executes advertisement program code and advertisement creative program code to create a deployable advertisement. For example, creative program code can comprise directions as to font, images, text, or other stylistic parameters. The deployable advertisement is then transmitted to an advertisement distribution network, step 1018. An advertisement distribution network serves to connect web pages that wish to host advertisements with advertisers that are looking for places to run advertisements. The advertisement distribution network transmits the deployable advertisement to clients as part of the requested digital asset, step 1020.

FIG. 11 presents exemplary advertisement program code according to one or more implementations of the present invention. For example, the example program code is in the HTML language and serves to run a script in the JAVASCRIPT language. Other script languages known in the art can be used to create the advertisement program code depending on the advertisement application desired (e.g., for a particular browser) and as long as the language chosen is supported by a user's particular browser.

Figure 12:
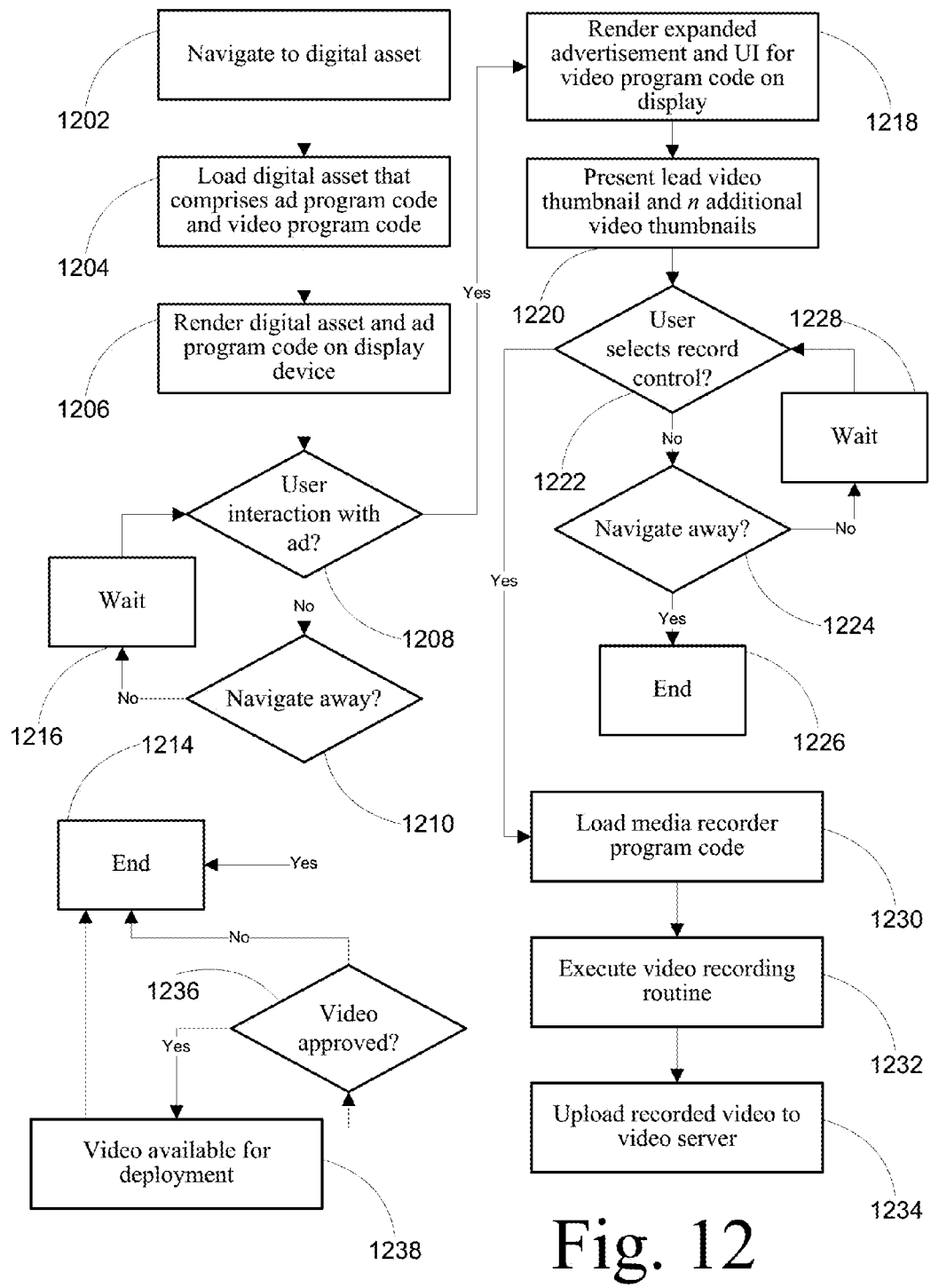
FIG. 12 presents a flow diagram illustrating a method for interacting with an advertisement deployed as part of a digital asset to provide video comments according to one or more embodiments of the present invention.

FIG. 12 presents a flow diagram illustrating a method for interacting with an advertisement deployed as part of a digital asset to provide video comment submissions according to one or more implementations of the present invention. This method comprises particular interactions that a user can have, for example, while interacting with an advertisement to record and upload a video comment for subsequent distribution in conjunction with the advertisement. The method of FIG. 12 starts at step 1202, in which a user navigates to a digital asset. For example, the user can use a web or mobile Internet browser to connect to a web page having an interactive advertisement in accordance with embodiments of the present invention. At step 1204, a processor executes advertisement program code and video program code to load the digital asset. The processor renders the digital asset and advertisement on a display at the requesting client device, step 1206. The processor scans available inputs to determine whether the user has interacted with the advertisement, step 1208. For example, on the digital asset, the user can interact with the advertisement by selecting the advertisement or interacting with the advertisement in a way known in the art (e.g., clicking it with a cursor, hovering a cursor over the advertisement, tapping it on a mobile device). If the user has not interacted with the advertisement, then at step 1210, the processor determines whether the user has navigated away from the digital asset (e.g., if the user closes the web page). If the user has navigated away from the digital asset, program flow terminates at step 1214. If the user has not yet navigated away from the digital asset, the program code instructs the processor to enter the thread in which it is executing into a wait state, step 1216, until the receipt of further user interaction; program flow loops back to step 1208.

With continued reference to FIG. 12, if the user interacts with the advertisement, then program flow branches to step 1218, in which the processor executes video program code to render an expanded advertisement and corresponding user interface ("UI"). For example, the expanded advertisement can increase in size and modify its creative display style. At step 1220, the UI for the expanded advertisement presents thumbnail for a lead video and n additional video thumbnails, where the value of n is determined by parameters in the program code. For example, a desktop browser may present a greater number of additional video thumbnails than a mobile browser due to the higher resolution available on desktop displays. In one or more implementations, the expanded advertisement includes on the UI, record controls, playback controls, submission controls, full screen controls, and/or navigational controls for viewing additional video thumbnails not presently shown on the UI. At step 1222, program code instructs the processor to perform a check to determine whether a user has selected a record control. If the processor is not in receipt of a command indication selection of the record control, the processor determines whether the user has navigated away from the expanded advertisement (e.g., if the user closes the expanded advertisement), step 1224. If the user has navigated away from the expanded advertisement, then program flow terminates, step 1226. If the user has not yet navigated away from the expanded advertisement, program code instructs the processor to enter the thread in which it is executing into a wait state, step 1228, causing program flow to return to step 1222.

If the user has selected a record control, however, program flow branches to step 1230, in which the processor executes program code to load a media recorder. In one or more implementations, the media recorder is of the type described or implements functionality as described by FIGS. 2 through 4 and/or FIGS. 5 and 6. At step 1232, the user executes a video recording routine to produce recorded video. The processor uploads the recorded video to a video server, step 1234. For example, the user selects a submission control as described elsewhere in one or more implementations herein to commence transmission of the video to the video server. The video server receives the submission and determines an approval status therefor, step 1236. In one or more implementations, the video is processed and automatically analyzed to flag for inappropriate audio and/or images. In one or more implementations, the video is subject to moderator review prior to deployment. If the video fails to receive approval for distribution, program flow ends, step 1214. If the video receives approval for distribution, the video is made available for deployment through the digital asset and/or advertisement, step 1238. For example, if the video is available for deployment, it can be included as a thumbnail preview within the expanded advertisement. Thereafter, program flow terminates, step 1214.

Figure 13:
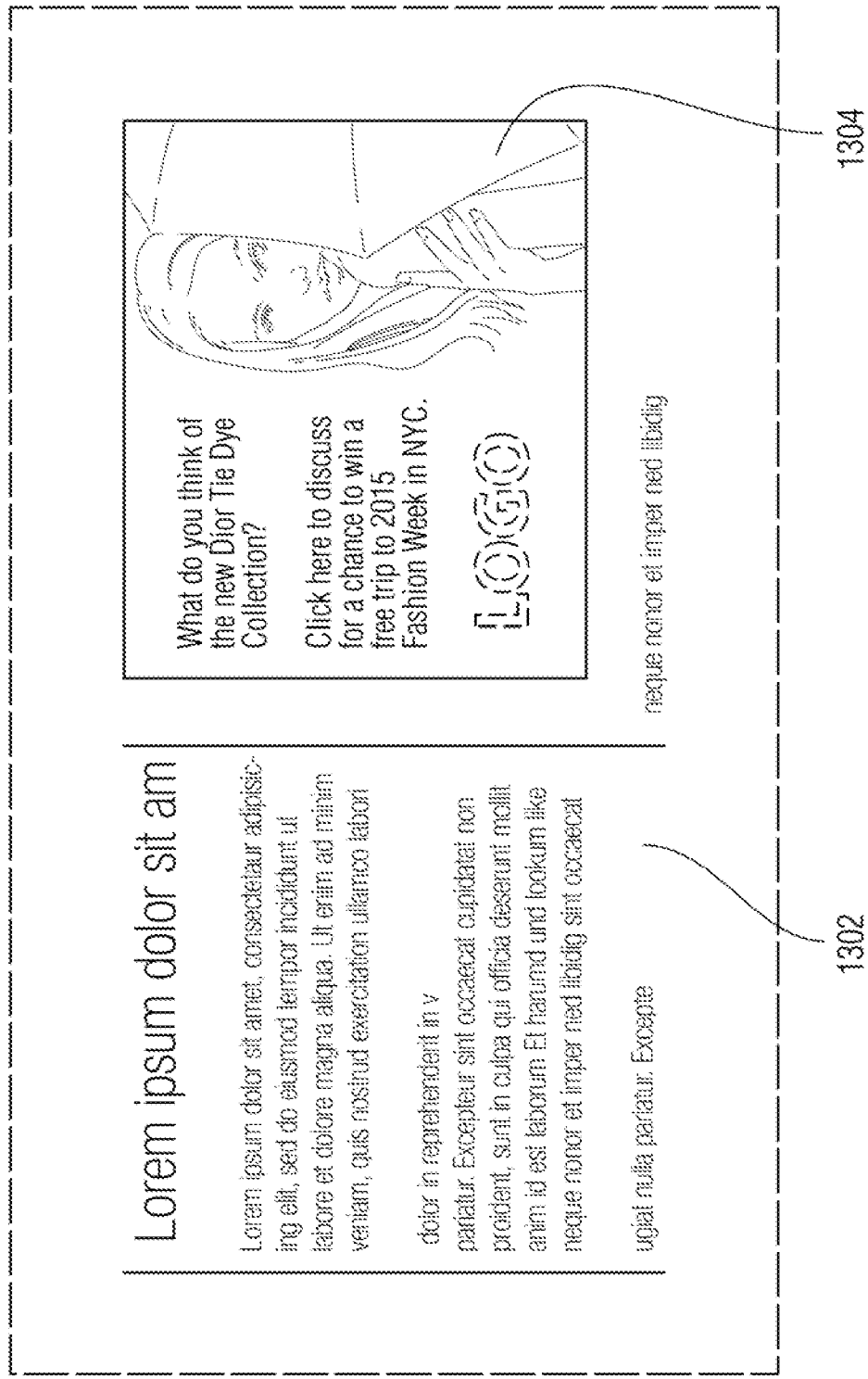
FIG. 13 presents an example user interface for providing video comments within an advertisement displayed in a web browser according to one or more embodiments of the present invention.
Figure 14:
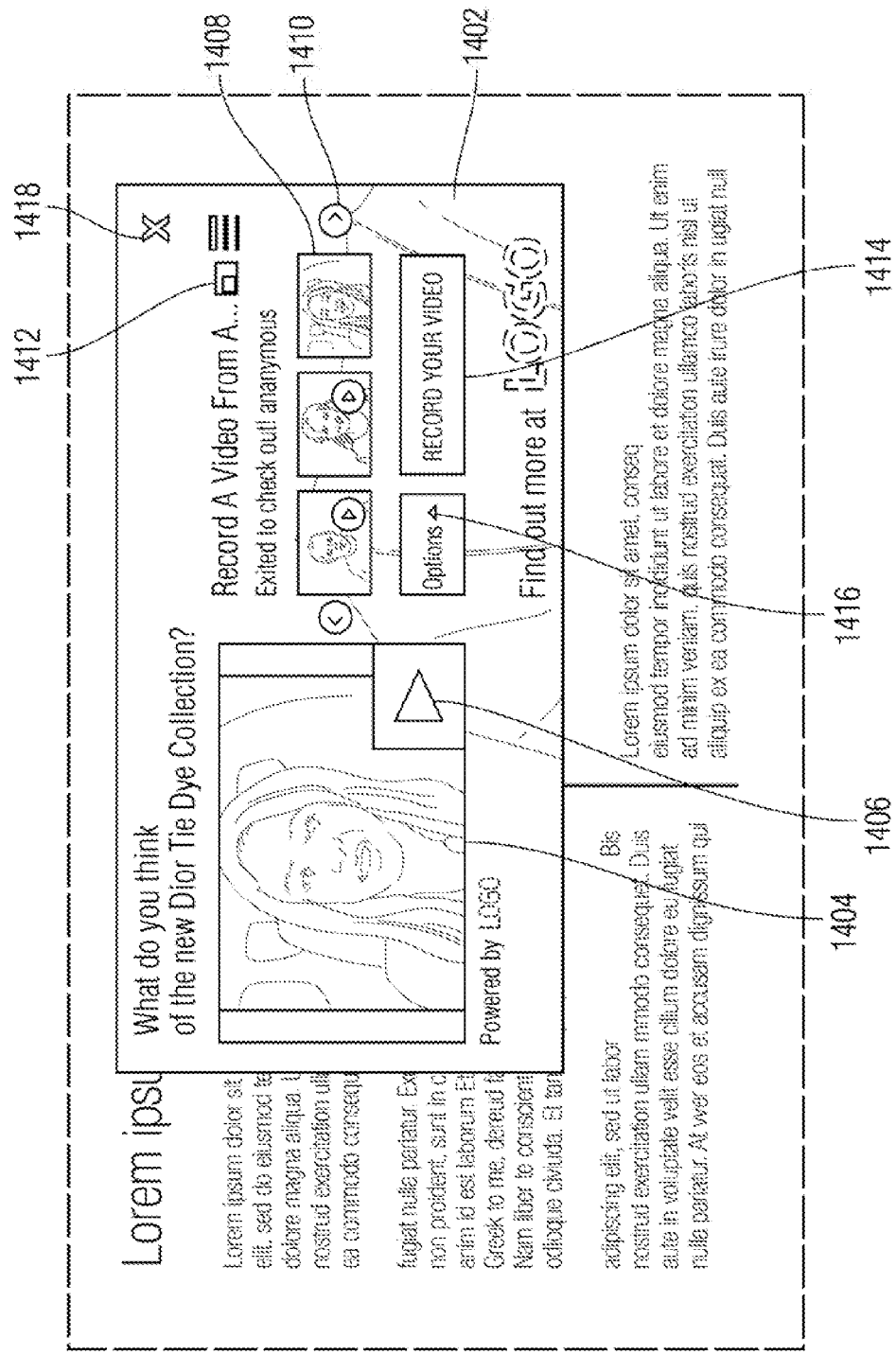
FIG. 14 presents a continuation of an example user interface for providing video comments within an advertisement displayed in a web browser after the web browser has received user input according to one or more embodiments of the present invention.
Figure 15:
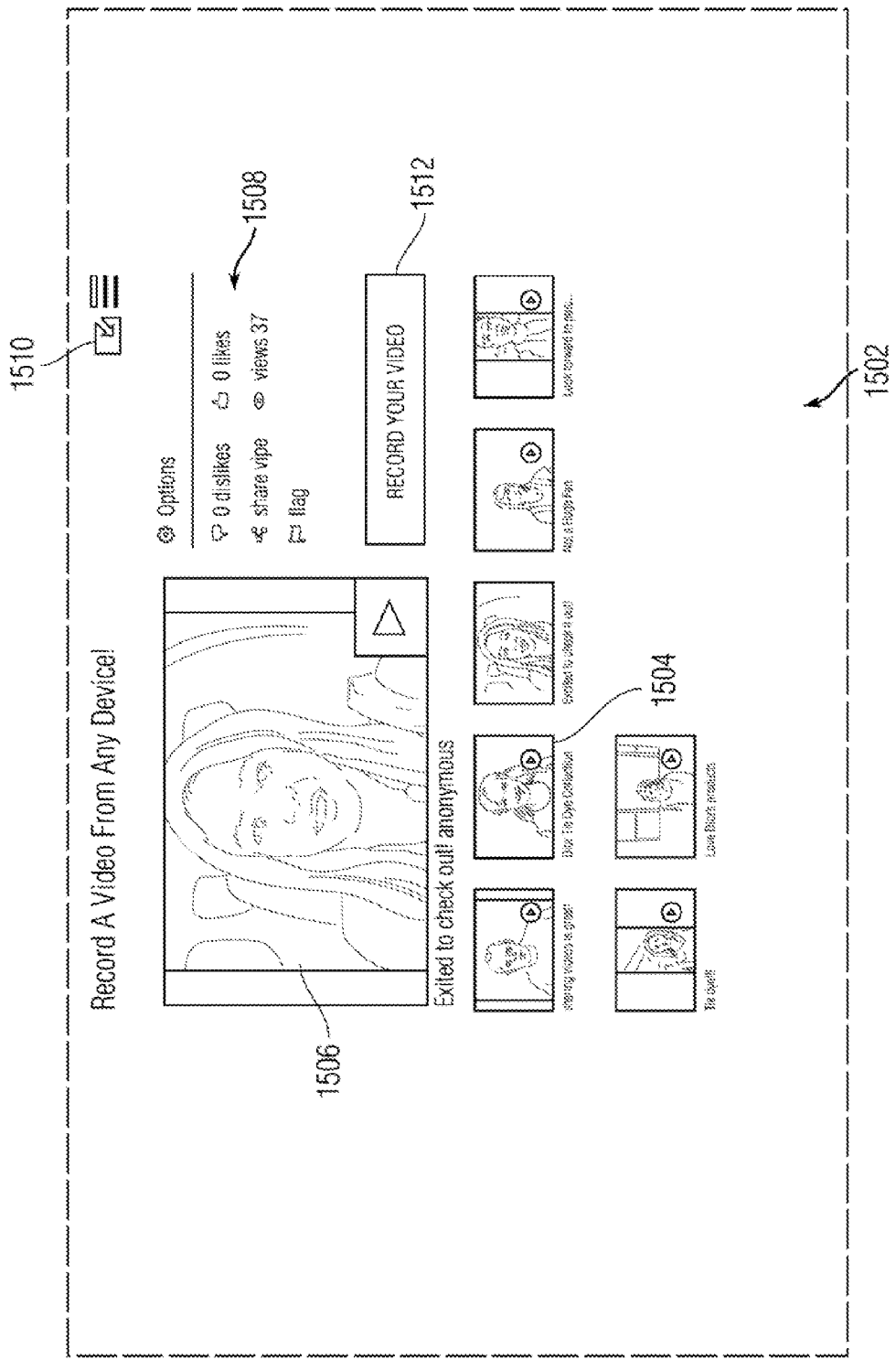
FIG. 15 presents a continuation of an example user interface for providing video comments within an advertisement displayed in a web browser after the web browser has received further user input according to one or more embodiments of the present invention.

FIGS. 13 through 15 present exemplary user interfaces for providing video comments within an advertisement displayed in a web browser according to one or more implementations of the present invention. FIG. 13 illustrates a digital asset 1300 having content 1302 and an advertisement 1304. In one or more implementations, the digital asset 1300 is a web page accessible through a desktop, laptop, or mobile browser. The content 1302 can be any type of content typically provided through a webpage, such as text, graphics, video, and/or other multimedia. In an HTML framework, the advertisement 1304 can be located within a separate web page frame, included within an iframe within the body of content 1302, or located in the digital asset in any other way or manner commonly known in the art. The advertisement 1304 can be of any type known in the art that provides for user interaction. For example, if the user selects the advertisement 1304, it can expand in size and style, as shown in FIG. 14. The user may select the advertisement 1304, for example, by clicking it with a cursor provided by an input device, hovering a cursor over the advertisement, and/or tapping on it using a mobile device.

FIG. 14 illustrates the exemplary user interface of FIG. 13 in expanded form after selection of the advertisement in some manner. The advertisement 1402 expands beyond the display borders of the collapsed advertisement 1304. In one or more implementations, this expansion is managed by settings found in program code (e.g., the example code in FIG. 11). The UI of the advertisement 1402 comprises one or more interactive elements. An expanded thumbnail is provided for a lead video 1404, including provision of a play control 1406. One or more thumbnail videos 1408 are available for selection and playback. In one or more implementations, selection of a thumbnail video 1408 replaces the lead video 1404 with the selected thumbnail video, such that the thumbnail video becomes the new lead video and is available for playback.

The number of thumbnail videos 1408 displayed at a given time is limited as a function of the display size of the expanded advertisement 1402 and browser restrictions. To navigate to additional videos not presently shown as thumbnails, a user can select navigational controls 1410. A user can record and submit a video submission as described elsewhere in the present application by selecting a record control 1414. In one or more implementations, an options control 1416 is included. For example, selecting the options control 1416 allows a user to "like" or "dislike" a video, to flag it for review, or to gather information about the video, such as the number of views, which may be compiled for ranking and other analysis purposes. In one or more implementations, the advertisement 1402 includes a full screen control 1412, which when selected, expands the advertisement to the maximum height and width allowed by the browser. A close control 1418 can return the advertisement 1402 to a non-expanded or collapsed state, as FIG. 13 illustrates. In one or more implementations, if the user interacts with a display portion outside of the advertisement 1402, the advertisement returns to a non-expanded or collapsed state.

FIG. 15 illustrates the exemplary user interface of FIGS. 13 and 14 in a full screen mode (e.g., by selecting full screen control 1412). The full screen advertisement 1502 comprises one or more thumbnail videos 1504 beyond those displayed in the expanded state, as well as a lead video 1506 capable of playback. In one or more implementations, the options control 1508 is in expanded form to expose available options, described above. A user can begin the recording process by selecting record control 1512. The advertisement returns to its expanded state in response to selection of a minimize screen control 1510. In one or more implementations, other input functions can return the advertisement to the expanded state, such as selecting the Escape key on an input keyboard.

Figure 16:
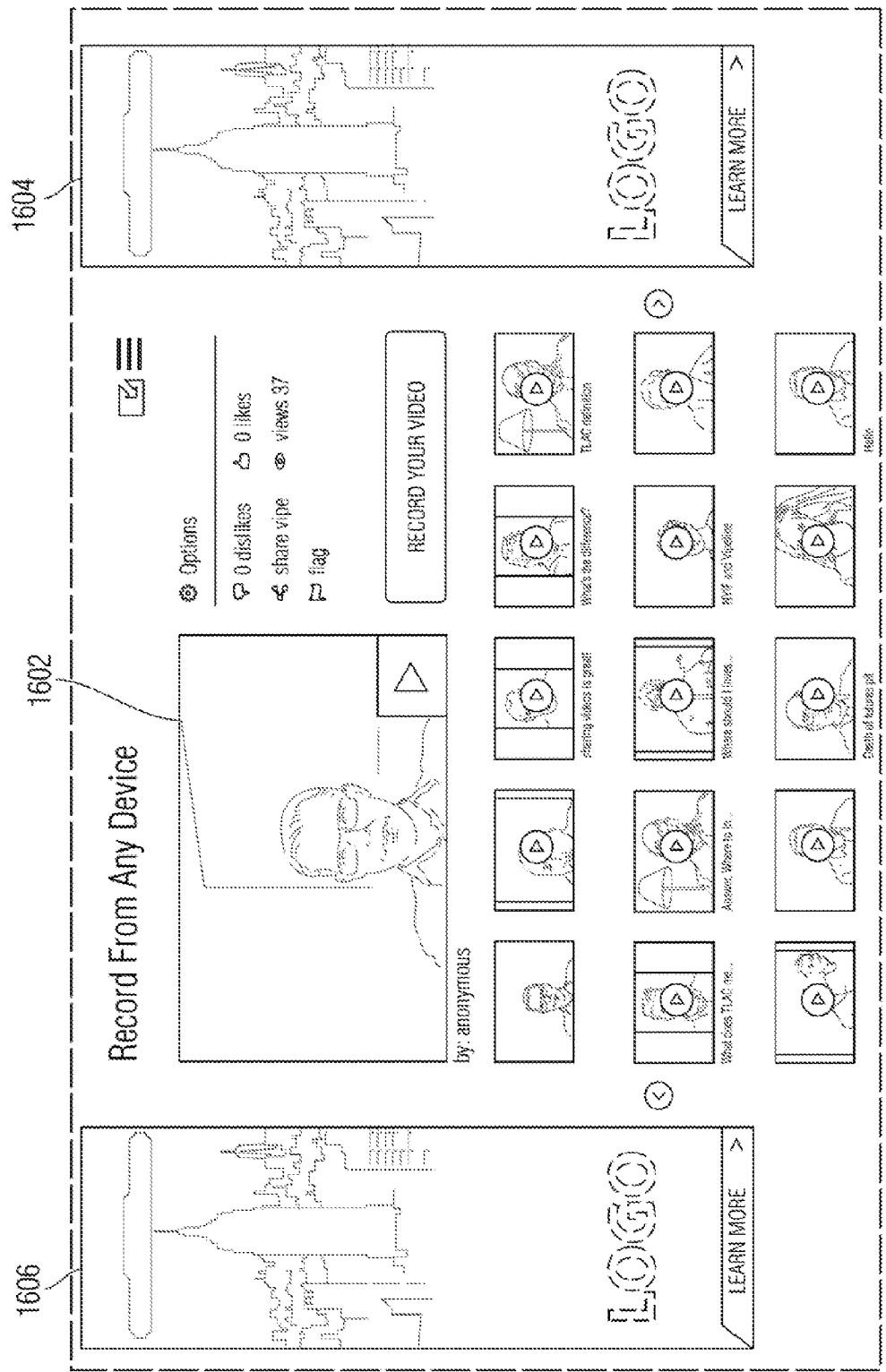
FIG. 16 presents an example user interface for providing video comments illustrating one or more static advertisements according to one or more embodiments of the present invention.

FIG. 16 illustrates an exemplary user interface for providing video comments, illustrating one or more static advertisements according to one or more implementations of the present invention. In the exemplary UI of FIG. 16, the advertisement is in an expanded or full screen state. The exemplary UI comprises a lead video 1602 capable of playback. In one or more implementations, one or more static advertisements are included on the expanded or full screen UI. Static advertisements, such as, for example, tower advertisements 1604 and 1606 add an extra monetization layer to a digital asset beyond the initial user interaction with the advertisement on the digital asset.

Figure 17:
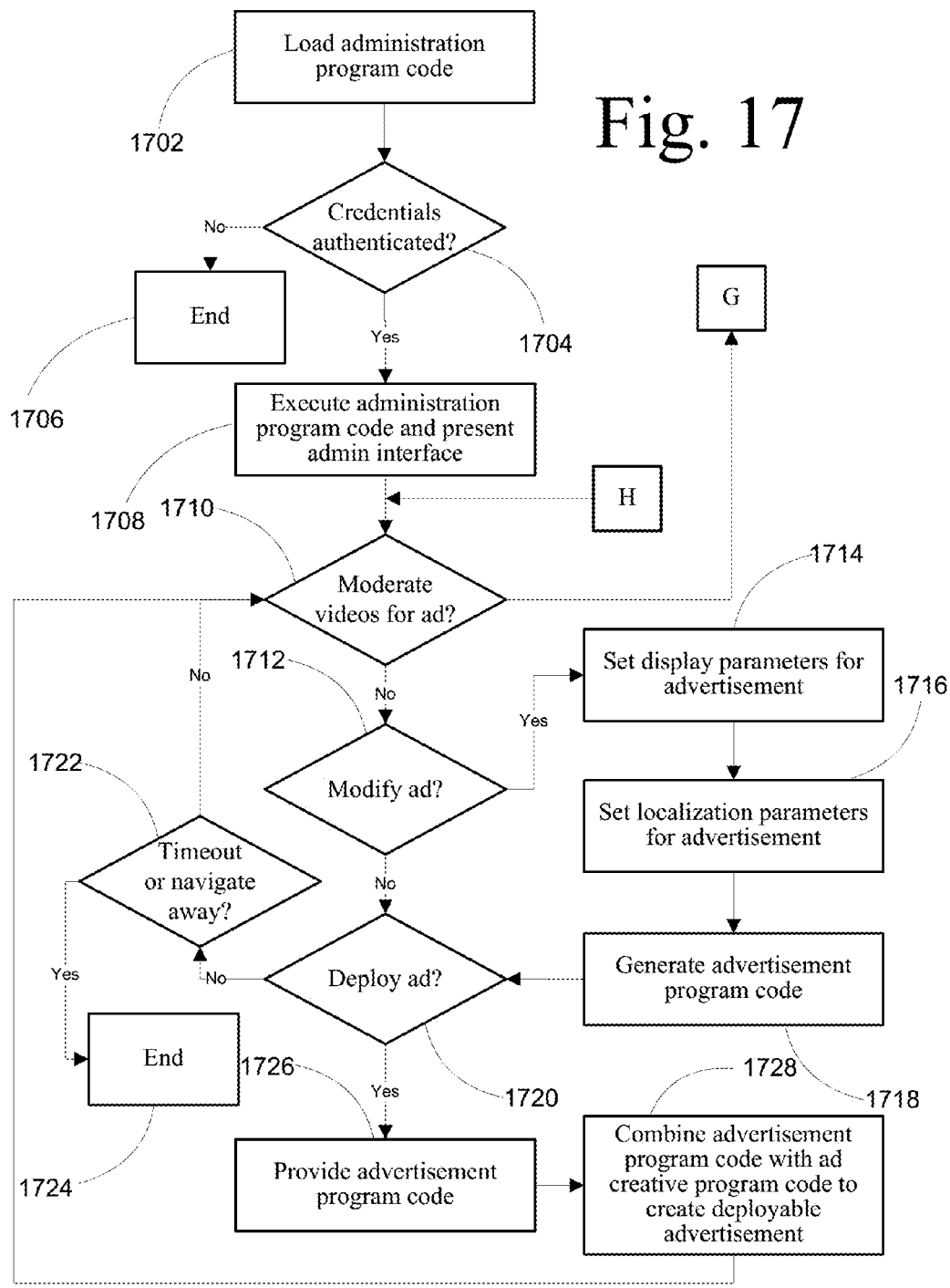
FIG. 17 presents a flow diagram illustrating a method for providing an administrative tool for interacting with uploaded and post-processed video comments according to one or more embodiments of the present invention.
Figure 18:
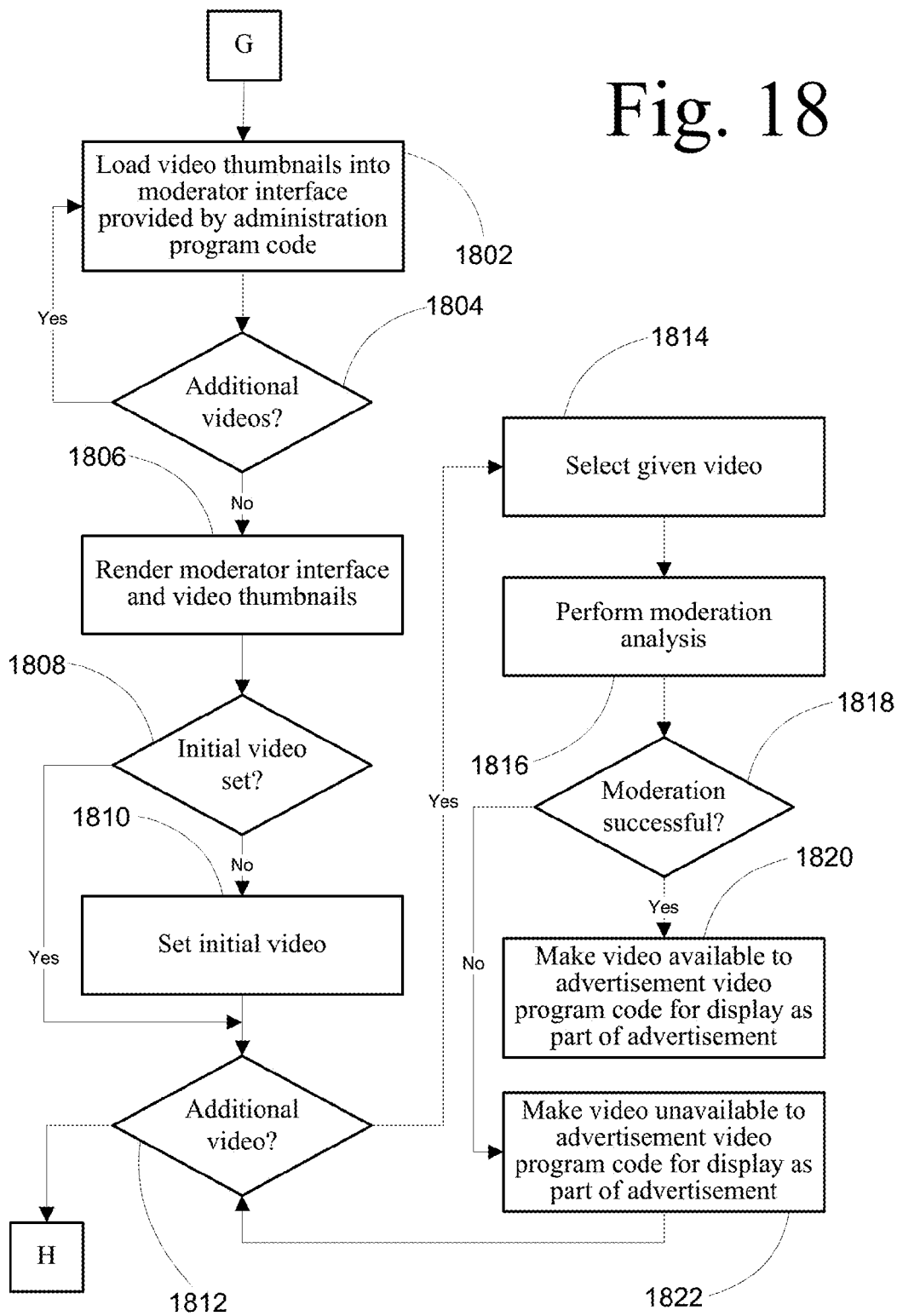
FIG. 18 presents a flow diagram illustrating a continuation of the method for providing an administrative tool for interacting with uploaded and post-processed video comments according to one or more embodiments of the present invention.

FIGS. 17 and 18 present flow diagrams illustrating a method for providing an administrative tool for interacting with uploaded and post-processed video comments according to one or more implementations of the present invention. This exemplary methodology and program flow may be loaded into a processor for execution subsequent to video submission, e.g., after a video has been recorded, uploaded, and processed by the video server, but prior to deployment to the public via a digital asset. Administrative tools provide the advantages of being able to further moderate submitted video content beyond automated analyses. For example, a content moderator can review user submitted videos to approve, reject, or flag specific videos for further review, edit video titles, decide which submitted videos appear first as the lead video upon expansion of an advertisement, etc. These and other similar options provide an advertiser with a large degree of control over the specific videos that are publicly deployed and thus tied to the advertiser's brand.

With reference now to FIG. 17, the method begins at step 1702 in which a processor executes program code to load an administration tool. In one or more implementations, only authenticated users (e.g., an administrator) can access the administration tool. User authentication may be effected in accordance with a number of methodologies that are well known to those of ordinary skill in the art. At step 1704, the processor determines whether the user's credentials are authenticated. For example, the program code may require a user name and password. If the processor is unable to authenticate the user credentials, program flow terminates, step 1706. If the processor is able to authenticate the user credentials, the processor executes administration program code to present an administrative user interface ("AUI"), step 1708.

In one or more implementations, the AUI comprises program code that exposes functionality through the display of one or more controls as part of a UI to select, moderate, deploy, and/or modify video submissions for a particular advertisement. At step 1710, the program code instructs the processor to perform a check to determine receipt of the selection of a moderation control. If no moderation control is selected, the processor determines whether a modify advertisement control is selected, step 1712. If a modify advertisement control has been selected, then program flow branches to step 1714, in which the administrator can set display parameters for the advertisement. For example, the administrator can set the maximum height and width of the advertisement display. At step 1716, the administrator can set localization parameters for the advertisement. For example, the administrator can determine that the advertisement is to only be displayed as a banner advertisement or only located within a particular web page frame. Alternatively, or in conjunction with the foregoing, the processor may read in parameter information, including the above-described parameters, in an automated fashion, such as receiving input from resource, library or template files. Based on the foregoing, the processor executes program code to generate the advertisement program code, step 1718.

If no modify advertisement control is selected or the advertisement has already been generated, the program code instructs the processor to perform a check to determine receipt of the selection of a deploy control, step 1720. If no deploy control has been selected, then the processor determines whether the administrator has timed out or navigated away from the administrative tool, step 1722. A time out serves to limit the chances that a non-administrator could acquire access to the administrative tool if the administrator leaves his or her computing device while logged into the tool. If the administrator has timed out or navigated away, then program flow terminates, step 1724. If the administrator is merely idling prior to the time out threshold, then program flow loops to step 1710. However, if the deploy control is selected, program flow branches to step 1726, in which advertisement program code is provided to the processor. The processor combines and executes the advertisement program code with advertisement creative code to create a deployable advertisement, step 1728. In one or more implementations, the deployable advertisement is then deployed to the digital asset. For example, this may be accomplished by providing the deployable advertisement to an advertisement distribution network, which then distributes the advertisement to digital assets.

Continuing now with reference to FIG. 18, if the processor determines the administrator has selected the moderation control at step 1710, program flow branches to step 1802, in which the processor executes administration program code to load a video as a thumbnail into a moderator user interface ("MUI"). In one or more implementations, the processor renders the MUI in a frame within the AUI. In one or more implementations, the MUI temporarily displaces the AUI. For example, if the administrator accesses the administrative tool via mobile device, the MUI may displace the AUI until moderation is complete because a given mobile device typically possesses less available screen resolution than a desktop display. The processor determines whether there is an additional video that can be loaded as a thumbnail into the MUI, step 1804. Such additional videos are available if users have recorded and submitted them to the video server. If there is at least one additional video available, step 1804, program flow loops to step 1802 and the additional video is loaded into the MUI. If there are no further videos available to be loaded, the processor renders the MUI and associated video thumbnails, step 1806. In one or more implementations, the number of displayed video thumbnails is limited by the available display resolution. For example, if the display resolution can only display four (4) videos in the MUI at a time, and there are more than four videos loaded into the MUI, then the remaining videos will be loaded but not rendered. To render additional videos, a page control or scroll control can be included as a UI navigation component as is known in the art.

The method continues at step 1808, in which the processor determines whether an initial video has been set. An initial video is a video selected by the processor or the administrator that will be the lead video shown when an advertisement is expanded (e.g., lead video 1404 or lead video 1506). At step 1810, the processor sets the initial video. In one or more implementations, if the administrator has not selected an initial video, then the processor can execute program code describing a default method for selecting an initial video. For example, the program code can instruct the processor to select the first submitted and/or approved video as a default initial video. Once an initial video has been set, then at step 1812, the processor and/or the administrator determine whether there additional videos to moderate. If there are no further videos to moderate, then the method loops to step 1710 and waits for further administrator selection.

If there are additional videos awaiting moderation, program flow branches to step 1814, in which the administrator selects a given video and at step 1816 the administrator and/or processor performs a moderation analysis. For example, the moderation analysis can include making videos unavailable if their audio or video content is unacceptable under set guidelines. At step 1818, the processor determines whether the moderation has been successful. In one or more implementations, moderation is successful if the administrator selects an approval control. In one or more implementations, moderation is unsuccessful if the administrator selects a rejection control. If the processor determines moderation was successful, then at step 1820, the video is made available to advertisement video program code. For example, the video is made available for display as part of an advertisement. If the processor determines moderation was unsuccessful, then at step 1822, the video is made unavailable to advertisement video program code. For example, the video is made unavailable for display as part of an advertisement. In either case, the method then loops to step 1812 and determines whether there are additional videos to moderate.

Figure 19:
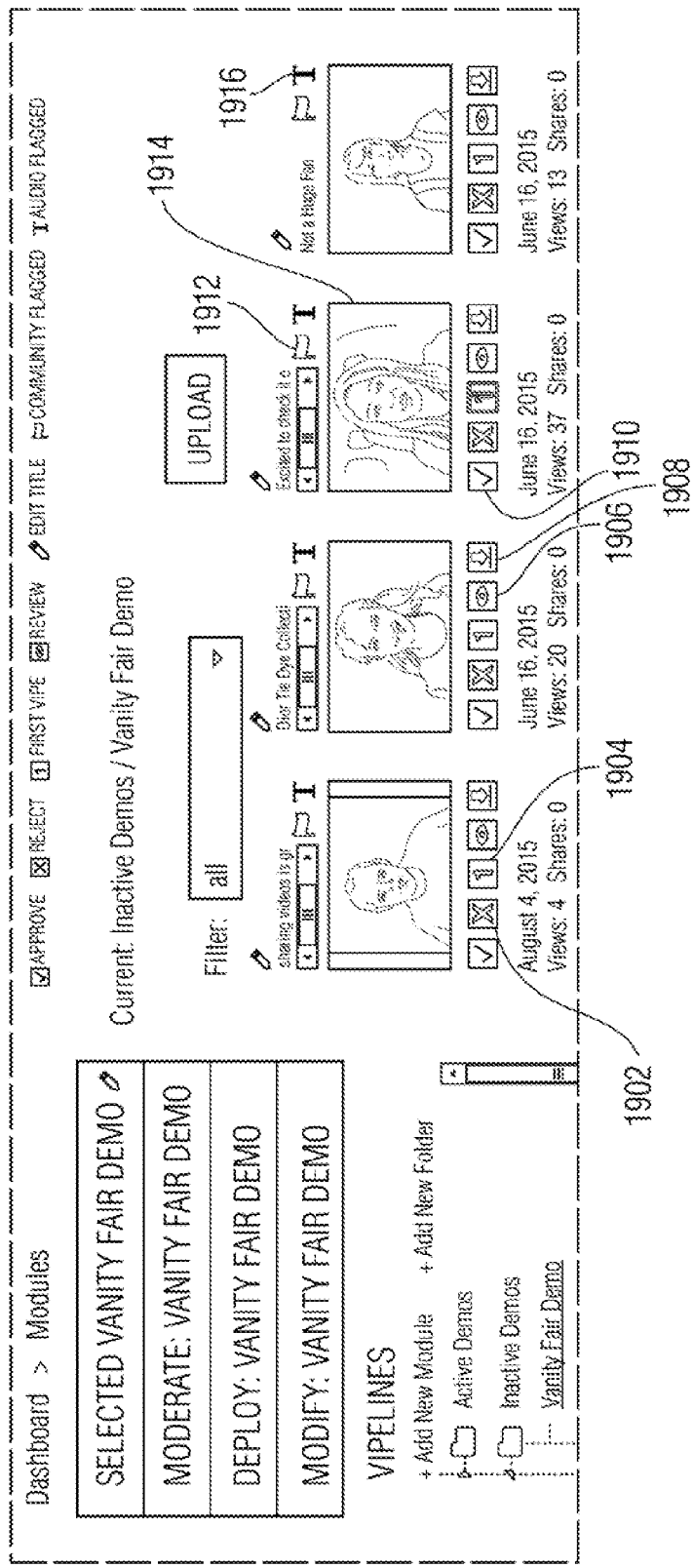
FIG. 19 presents an example user interface for managing uploaded and post-processed video comments according to one or more embodiments of the present invention.

FIG. 19 presents an exemplary user interface for managing uploaded and post-processed video comments according to one or more implementations of the present invention. A user interface 1900 includes one or more interactive control elements for performing moderation tasks on one or more user submitted videos 1914. In one or more implementations, there are interactive control elements specific to each video subject to moderation. As shown in the example user interface, moderation controls can include an approval control 1910 for approving a video for advertisement deployment, a rejection control 1902 for denying advertisement deployment, an initial video control 1904 to set the video as a lead video, a review control 1906 for playback, and a download control 1908 for downloading the video. In addition, the user interface can include a flag control 1912 for marking the video for later review and a title edit control 1916 for editing the title of the video.

FIGS. 1 through 19 are conceptual illustrations allowing for an explanation of the present invention. Those of skill in the art should understand that various aspects of the implementations of the present invention could be implemented in hardware, firmware, software, or combinations thereof. In such implementations, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single implementation, as other implementations are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific implementations will so fully reveal the general nature of the invention that others can, by applying knowledge within the skill of the relevant art(s) (including the contents of the documents cited and incorporated by reference herein), readily modify and/or adapt for various applications such specific implementations, without undue experimentation, without departing from the general concept of the present invention. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary implementations, but should be defined only in accordance with the following claims and their equivalents.

What is claimed is:

1. A method for recording video into an HTML framework, the method comprising:

navigating to a digital asset that comprises program code embedded within the HTML framework;

displaying the digital asset onto a display at a user computing device, wherein the user computing device has a processor, a memory, and a connection to a network;

presenting, by the processor executing code embedded within the HTML framework, a video recording user interface to a recorder application within the digital asset, wherein the video recording user interface has at least one interactive control;

initiating a video recording session by receipt of one or more commands that indicate interaction with the at least one interactive control;

accessing at least one video and audio recording hardware component located at the user computing device;

creating a stream object for storage in the memory by the processor executing code embedded within the HTML framework, wherein the stream object is configured to pass video and audio data recorded by the at least one video and audio recording hardware component as input to the recorder application;

recording video and audio data received at the video and audio hardware to the stream object;

processing, by the processor executing code embedded within the HTML framework, the recorded video and audio data for storage as a binary large object ("BLOB"); and transmitting the BLOB over the network to a video server for playback by one or more computing devices other than the user computing device.

2. The method according to claim 1, wherein the digital asset is a web page coded in an HTML framework.

3. The method according to claim 1, wherein the at least one video and audio recording hardware components comprises a camera and/or a microphone.

4. The method according to claim 1, comprising monitoring by the user computing device for interaction with the at least one interactive controls.

5. The method according to claim 1, comprising playing back of video and audio data through the digital asset.

6. The method according to claim 1, wherein recording video and audio data comprises:

creating a display canvas in the digital asset by the processor executing code embedded in the HTML framework; and drawing one or more video frames into the display canvas.

7. The method according to claim 6, comprising merging one or more video frames by the processor into a concatenated video file.

8. The method according to claim 1, wherein the step of recording video and audio data comprises executing program code embedded in the HTML framework by the processor to receive and store pulse-code modulation ("PCM") audio data to the memory.

9. The method according to claim 8, comprising merging the PCM audio data by the processor into a concatenated audio file.

10. The method according to claim 1, comprising extracting and encoding, by the processor, the video and audio data into a separate video file and a separate audio file.

11. The method according to claim 10, comprising analyzing, by the processor executing program code, the video file against a defined set of unacceptable image types.

12. The method according to claim 10, comprising the processor executing program code for parsing to the audio file into one or more speech terms and analyzing the one or more speech terms against a defined list of unacceptable speech terms.

* * * * *